US009453527B2

(12) United States Patent
Yoo et al.

(10) Patent No.: US 9,453,527 B2
(45) Date of Patent: Sep. 27, 2016

(54) MULTI-FUNCTION HOOK AND CARABINEER

(71) Applicant: Mina Yoo, Seattle, WA (US)

(72) Inventors: Mina Yoo, Seattle, WA (US); Grant Lindberg, Seattle, WA (US)

(73) Assignee: Mina Yoo, Seattle, WA (US)

( * ) Notice: Subject to any disclaimer, the term of this patent is extended or adjusted under 35 U.S.C. 154(b) by 222 days.

(21) Appl. No.: 14/263,809

(22) Filed: Apr. 28, 2014

(65) Prior Publication Data

US 2014/0317892 A1 Oct. 30, 2014

Related U.S. Application Data

(60) Provisional application No. 61/816,306, filed on Apr. 26, 2013.

(51) Int. Cl.
| | |
|---|---|
| *F16B 45/02* | (2006.01) |
| *A47G 29/08* | (2006.01) |
| *F16B 45/00* | (2006.01) |

(52) U.S. Cl.
CPC ............. *F16B 45/00* (2013.01); *A47G 29/083* (2013.01); *F16B 45/02* (2013.01); *Y10T 24/3453* (2015.01); *Y10T 24/3493* (2015.01); *Y10T 24/4545* (2015.01); *Y10T 24/45408* (2015.01)

(58) Field of Classification Search
CPC .. F16B 45/00; F16B 45/02; Y10T 24/45325; Y10T 24/45319; Y10T 24/45335; Y10T 24/45408; Y10T 24/45435; Y10T 24/45445; Y10T 24/4545; Y10T 24/3493; A47G 29/083
USPC .................................................. 248/339, 308
See application file for complete search history.

(56) References Cited

U.S. PATENT DOCUMENTS

| 8,371,546 | B2* | 2/2013 | Bauerly | A47G 29/083 |
| | | | | 248/339 |
| 2005/0161570 | A1* | 7/2005 | Bauerly | A47G 29/083 |
| | | | | 248/317 |
| 2006/0107499 | A1* | 5/2006 | Wu | F16B 45/00 |
| | | | | 24/370 |
| 2008/0083862 | A1* | 4/2008 | Salatka | A47G 29/083 |
| | | | | 248/308 |

* cited by examiner

*Primary Examiner* — Robert J Sandy

(57) ABSTRACT

A hook is attached to a carabineer via a mechanism which allows the hook to be deployed to function as a hook or stowed in a compact configuration. The combined carabineer-hook can be used to clip together more than one item or the hook can be deployed, the carabineer portion can be clipped to one item, the hook can be engaged with a surface, and the item can then be hung off of the hook. In addition, the hook can be deployed to hold one or more items while the carabineer is used to clip to another item (such as a ring, cable, rope, rail, etc.).

16 Claims, 27 Drawing Sheets

MULTI-FUNCTION HOOK AND CARABINEER

FIELD

This disclosure relates to a hook and carabineer combination which provides multiple functions.

BACKGROUND

The following description includes information that may be useful in understanding the present invention. It is not an admission that any of the information provided herein is prior art or relevant to the presently claimed invention, or that any publication specifically or implicitly referenced is prior art.

People commonly find themselves in circumstances where their hands are busy but they are nonetheless asked or would otherwise like to hold items. An example is when one person changes another person's diaper. Diaper-changing typically takes two hands as well as a bag to hold wipes, powder, clean diapers, dirty diapers, and similar. Even when there is a changing table, there often is not an adequate location for the diaper bag and it may not be desirable to put the diaper bag on the floor. Another example is when a person is traveling and needs to temporarily connect one piece of luggage to another, to a luggage cart, or to another surface, all while holding travel documents. Another example is when a person is hiking and needs to temporarily hang a bag or another item on a tree or ledge.

Carabineers have been used as an accessory to temporarily connect two items. In the above diaper-changing and hiking examples, while a carabineer can be connected to the strap of the diaper-changing bag or to a strap on the bag, the carabineer will not function well as a hook, to temporarily hook the bag to a table or to a ledge, when it is encumbered by the strap. Hooks are also used to hook one item to a surface or another item, though commonly the hook is permanently attached to one of the items. Most bags do not have hooks, nor would a permanently attached hook be a desirable accessory, as the hook would snag on items inappropriately and would likely not be viewed as fashionable.

Needed is a device which can be connected to and removed from a first item, which allows the item to be temporarily hooked or clipped to another object, and which can be folded to minimize the size of the device.

SUMMARY

A hook is attached to a carabineer via a mechanism which allows the hook to be deployed, to function as a hook, or stowed in a compact configuration. The combined carabineer-hook can be used to clip together more than one item or the hook can be deployed, the carabineer portion can be clipped to one item, the hook can be engaged with a surface, and the item can then be hung off of the hook. In addition, the hook can be deployed to hold one or more items while the carabineer is used to clip to another item (such as a ring, cable, rope, rail, etc.).

DETAILED DESCRIPTION

The following Detailed Description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connect," "connected," "connectable" or any variant thereof (including "disconnect," "disconnected," and similar) means two or more components which are or may be connected or disconnected without the use of tools, an adhesive or other chemical bond, or heat bonding (such as welding, brazing, and similar). As used herein, the term "attach," "attached," "attachable" or any variant thereof (including "unattached" and similar) means two or more components which are or may be attached through the use of tools, adhesive or other chemical bond, or heat bonding. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list.

Figure 1:
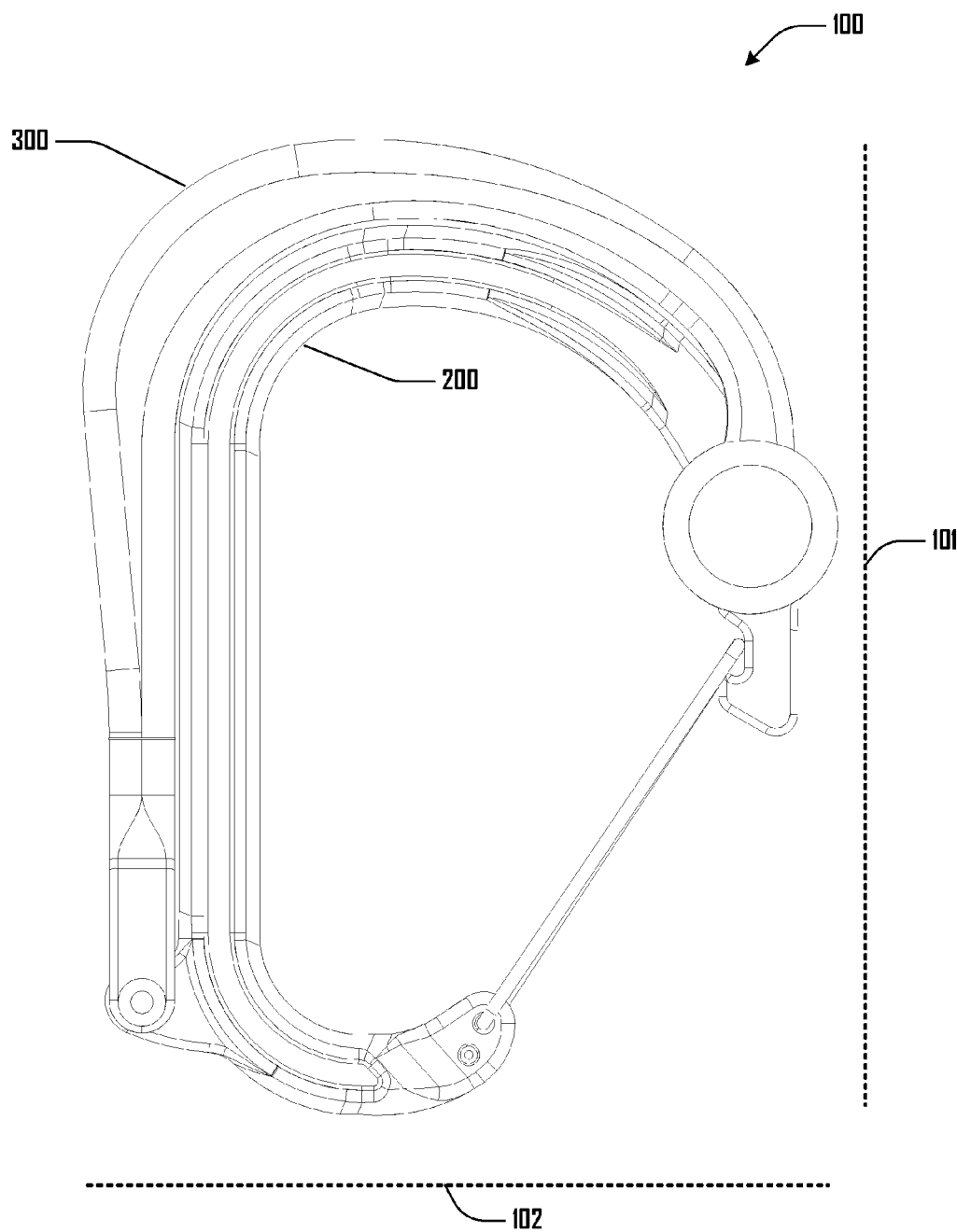
FIG. 1 is an elevation view of a first side of an embodiment of a Hook-Carabineer.

FIG. 1 is an elevation view of a first side of an embodiment of Hook-Carabineer 100. This illustration shows Hook-Carabineer 100 in a "closed" configuration (with Hook 300 not deployed—see FIG. 6 for an illustration with Hook 300 deployed). The illustrated Hook-Carabineer 100 generally follows the form of a D-shaped carabineer (wherein Basket 214 and Heel 218 are not symmetrical; see FIG. 2). Hook-Carabineer 100 may have another form, such as an oval carabineer (wherein Basket 214 and Heel 218 would generally be symmetrical), a circular carabineer, a square carabineer, or the like. Embodiments of Hook-Carabineers are illustrated and discussed herein for the sake of example. For the sake of convenience, a major axis of Hook-Carabineer 100 is labeled at element 101, a minor axis of Hook-Carabineer 100 is labeled at element 102, and the major and minor axis are discussed as laying on a plane, which plane is discussed herein as the plane of the Carabineer.

Figure 2:
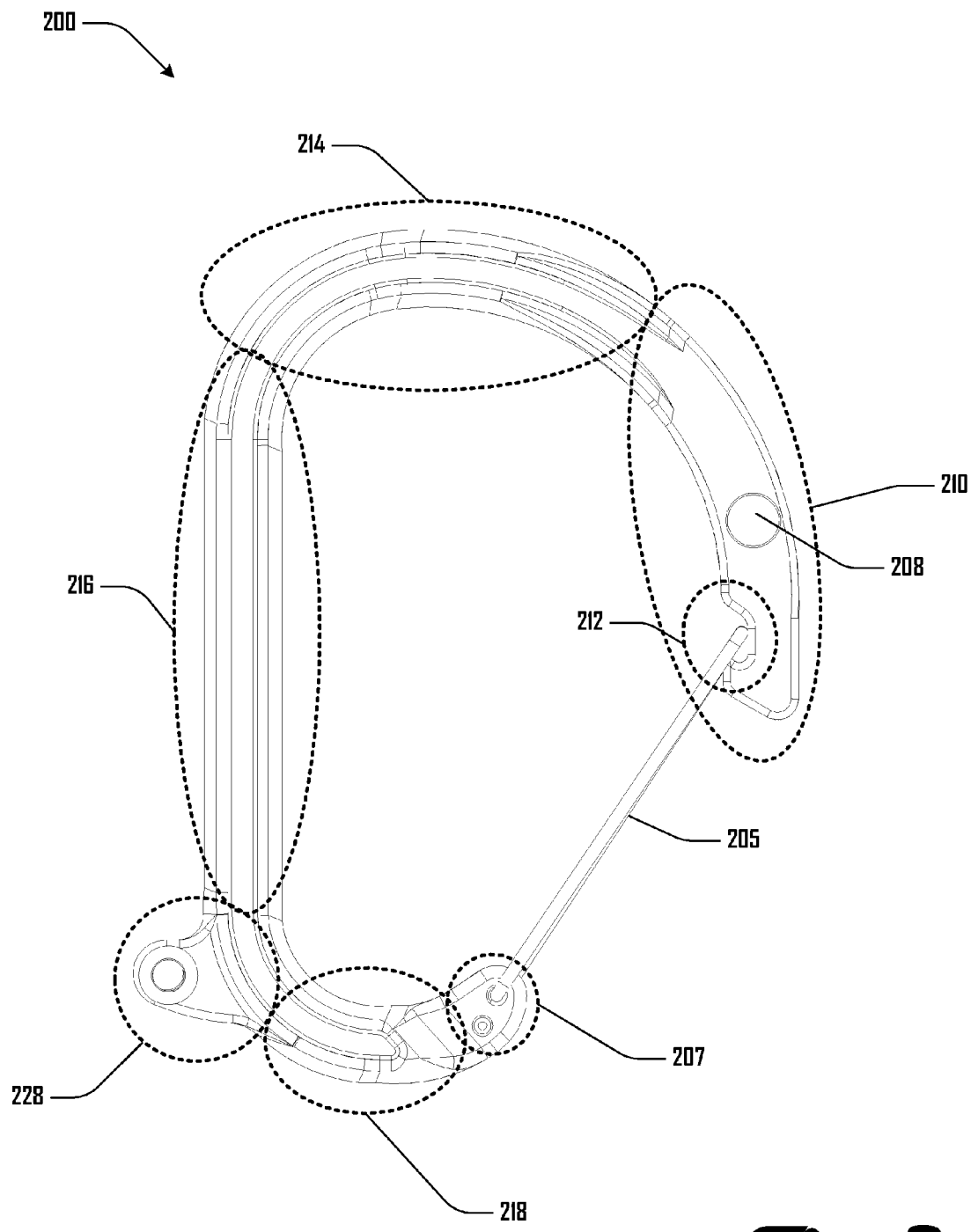
FIG. 2 is an elevation view of an embodiment of a Carabineer component of a Hook-Carabineer.

FIG. 2 is an elevation view of an embodiment of a Carabineer 200 component of Hook-Carabineer 100. FIG. 2 illustrates embodiments of the following components: Basket 214, Nose 210, Gate 205, Magnet 208, Heel 218, Swivel Bracket Mount 228, and Spine 216. Basket 214 is a curved or straight portion, generally transverse to Spine 216, generally at the end of Hook-Carabineer 100 opposite Heel 218. Basket 214 may hold or restrain an item, such as a handle, rope, rod, or similar, which may be passed into the Basket 214 area behind or through Gate 205. Nose 210 is a curved or straight portion, generally transverse to Basket 214 and, at least in this embodiment, approximately parallel to Spine 216. Nose 210 may comprise Notch 212 which may receive the Gate 205 and/or a pin in the Gate (please see FIG. 25, which illustrates a Solid Gate 2501, with a pin which is received by the Nose in FIG. 25). Nose 210 may comprise Magnet 208, which Magnet 208 may attract Hook 300 and/or Hook-Toe 342. Nose 210 may taper toward Notch 212 (see, for example, FIGS. 7 and 8), which tapered Nose 210 may be inserted or lodged in a crevice. Nose 210, tapered or otherwise, may be placed on a surface (see, for example, FIG. 22), with the Gate 205 displaced, to act as a hook.

Carabineer 200 may further comprise Gate Connector 207. In the embodiment illustrated in FIG. 2, Gate Connector 207 comprises two holes through which the ends of wire arms which make up Gate 205 may be passed. The two wire arms of Gate 205 may be of lengths which bias Gate 205 to return to a relaxed position outside of Nose 210; however, being prevented from returning to such position by Nose 210, Gate 210 is under tension and forms a spring which closes the Gate 210 against Nose 210, in Notch 212. In the Solid Gate 2501 embodiment illustrated in FIGS. 25 and 26, a leaf spring (or similar) may bias Gate 2501 to close against Nose and Notch.

Heel 218 is a generally curved or straight component, generally transverse to Spine 216, and which attaches Spine 216 and Gate 205, generally at the end of Hook-Carabineer 100 opposite Basket 214. Heel 218 may hold or restrain an item, such as a handle, rope, rod, or similar, which may be passed into the Heel 218 area via Gate 205. Not shown, Gate 205 may comprise a locking mechanism.

Figure 6:
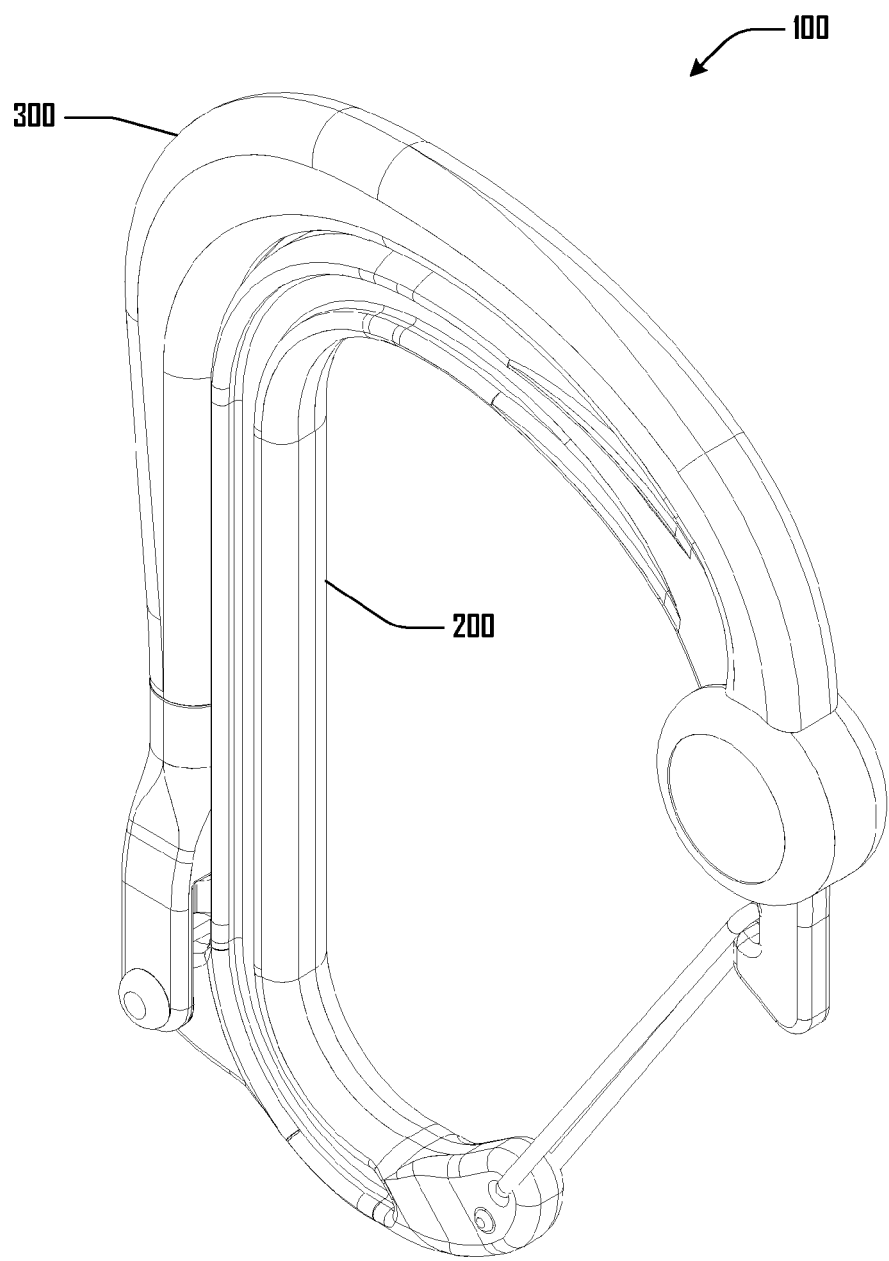
FIG. 6 is an isometric view of an embodiment of a Hook-Carabineer.
Figure 19:
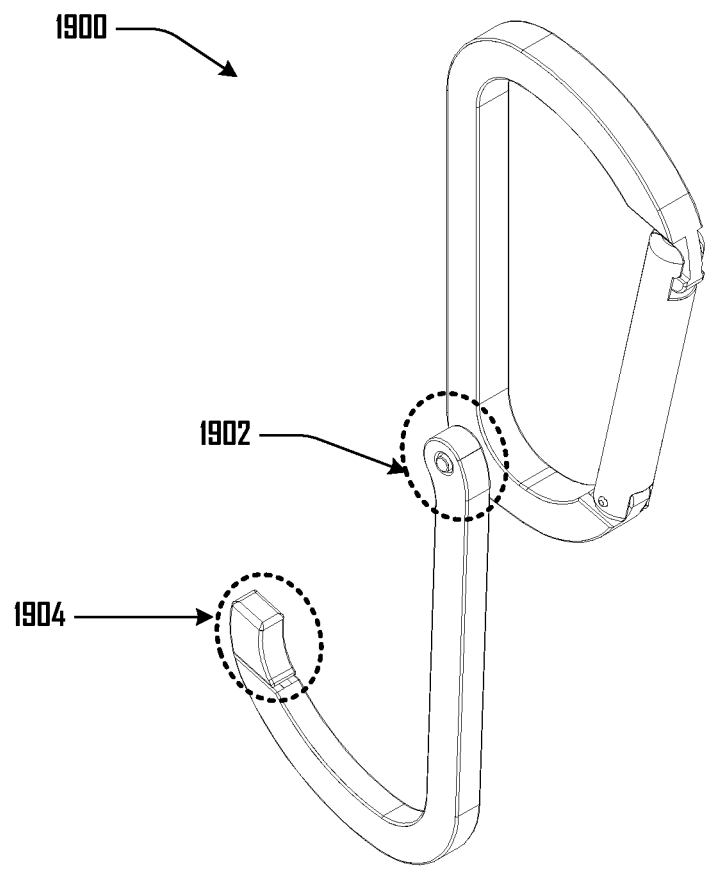
FIG. 19 is an isometric view of an embodiment of a Hook-Carabineer, in which the Hook rotates about an axis projecting off of the side of the Carabineer, in a plane next to the plane of the Carabineer.

Swivel Bracket Mount 228 attaches Carabineer 200 and Hook 300 at a joint formed by Hook-Bracket Axle 327, which Hook-Bracket Axle 327 has an axis of rotation perpendicular to the plane of the Hook-Carabineer 100. The joint formed by Swivel Bracket Mount 228 and the Hook-Bracket Axle 327 may also be referred to herein as the "hook hinge." The hook hinge allows Hook 300 to rotate away from or toward Carabineer 200, about the Hook-Bracket Axle 327. When rotated away from Carabineer 200, Hook 300 is referred to herein as "deployed." When deployed, Hook 300 may be placed with Hook-Toe 342 on a surface (see, for example, FIGS. 7 and 23) and/or with an object within Hook Arc 340, which may hold Hook-Carabineer 100 while an object, such as a handle for a bag, is suspended from or in Basket 214. Swivel Bracket Mount 228 may, for example (as illustrated in FIG. 2 or 6), lie in the same plane as Carabineer 200, or may lie in a plane next to the Carabineer; an example of the latter configuration is illustrated in FIG. 19 at element 1902. Deployment of Hook 300 may be facilitated by Swivel Bracket 326 and Swivel Interface 332 (between Swivel Bracket 326 and Hook-Spine 336), though the Hook 300 may be deployed if the materials of the Hook-Carabineer 100 are sufficiently flexible such that Hook 300 and Hook-Toe 342 can be disengaged from the Nose 210 with the Hook 300 then being rotated about the hook hinge. Swivel Bracket Mount 228 is generally diagonally opposite the end of Nose 210 and the Gate 205 opening (between Gate 205 and Nose 210), across the Carabineer 200; phrased another way, the Swivel Bracket Mount 228 may be located on the opposite end of both the major axis 101 and the minor axis 102, relative to the Nose 210.

Figure 3:
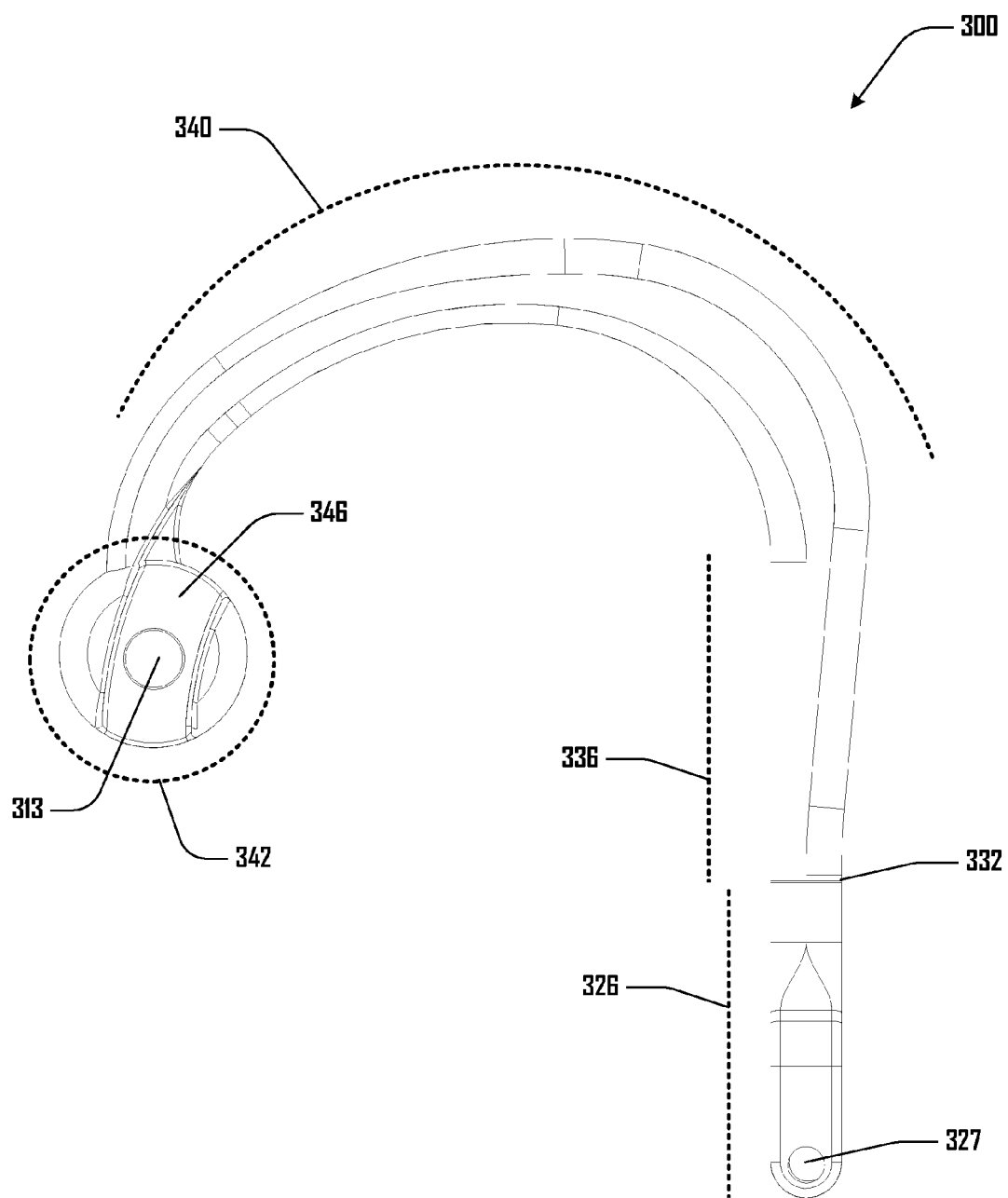
FIG. 3 is an elevation view of an embodiment of a Hook component of a Hook-Carabineer.

FIG. 3 is an elevation view of an embodiment of a Hook 300 component of Hook-Carabineer 100. This view illustrates the other side, relative to the side illustrated in FIG. 1. This view illustrates Swivel Bracket 326, Hook-Bracket Axle 327, Hook-Spine 336, Hook Arc 340, and Hook-Toe 342. Hook-Toe 342 is illustrated as comprising Toe-Nose-Slot 346, also referred to herein as a "channel," and Hook Magnet 313. Hook Magnet 313 may be attracted to, for example, Magnet 208 in Carabineer 200 and/or it may be attracted to the material of Carabineer 200.

Figure 13:
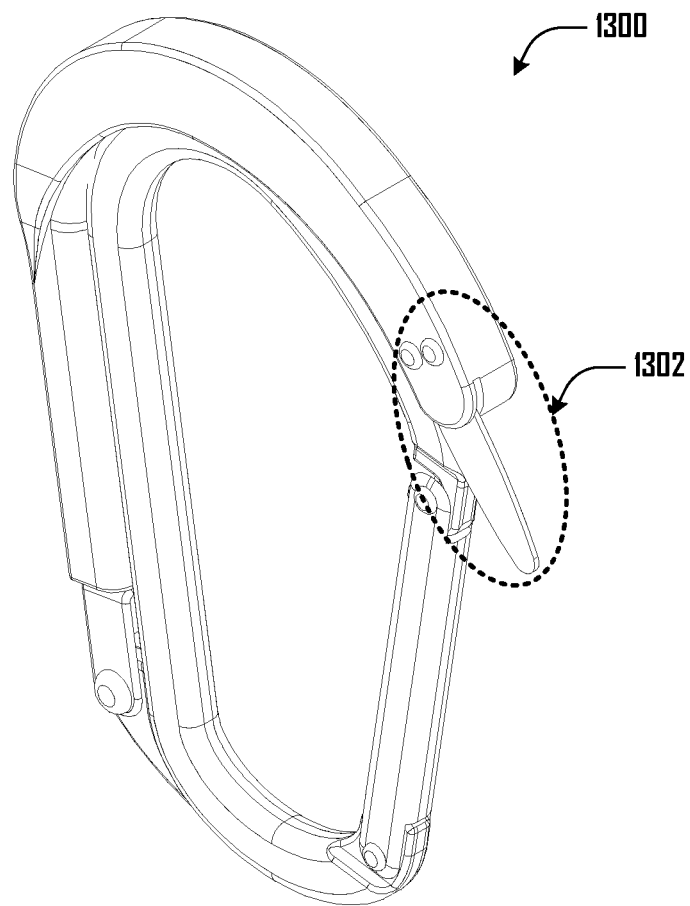
FIG. 13 is an isometric view of an embodiment of a Hook-Carabineer.
Figure 20:
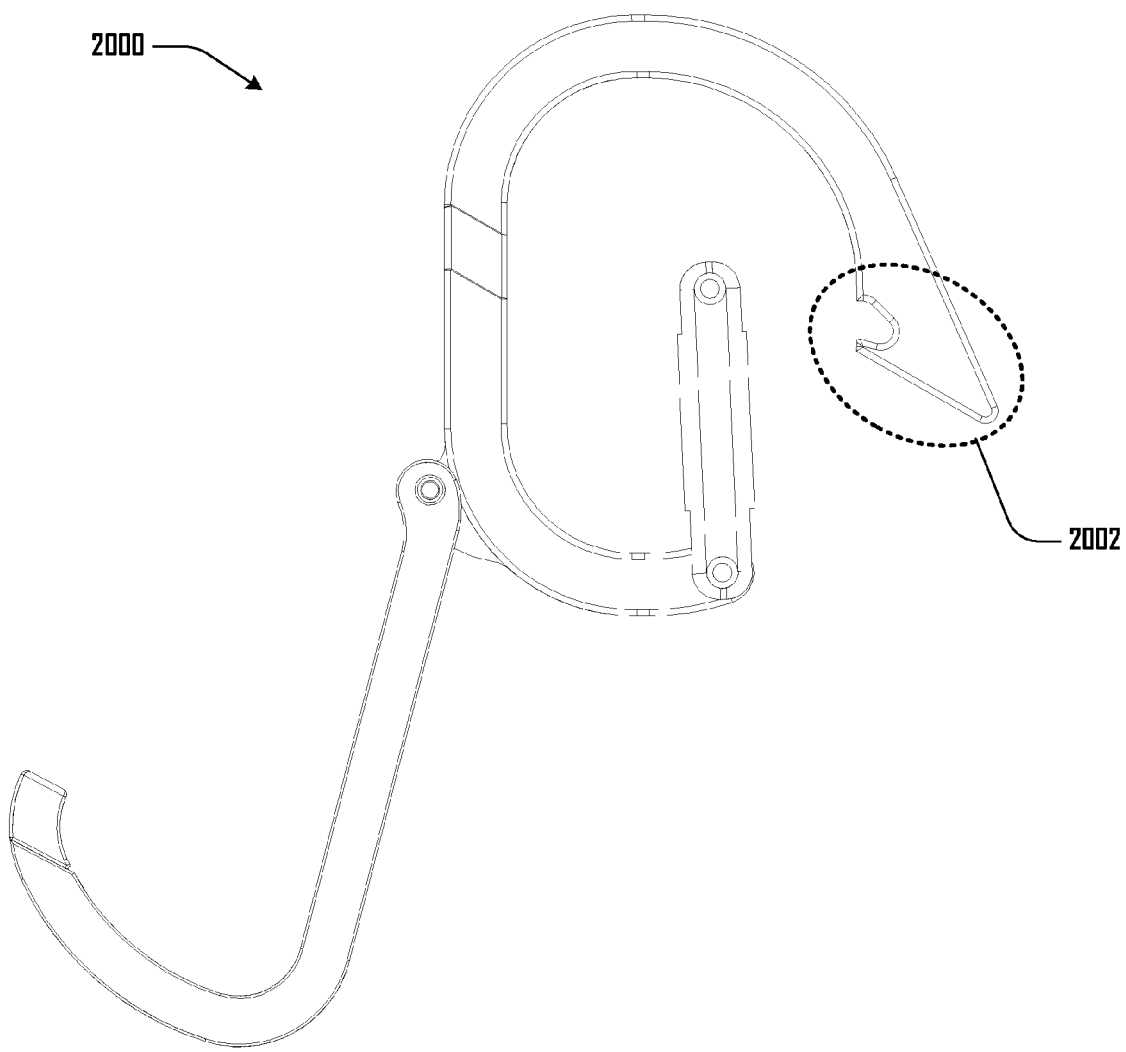
FIG. 20 is an elevation view of an embodiment of a Hook-Carabineer, with Hook component deployed.
Figure 21:
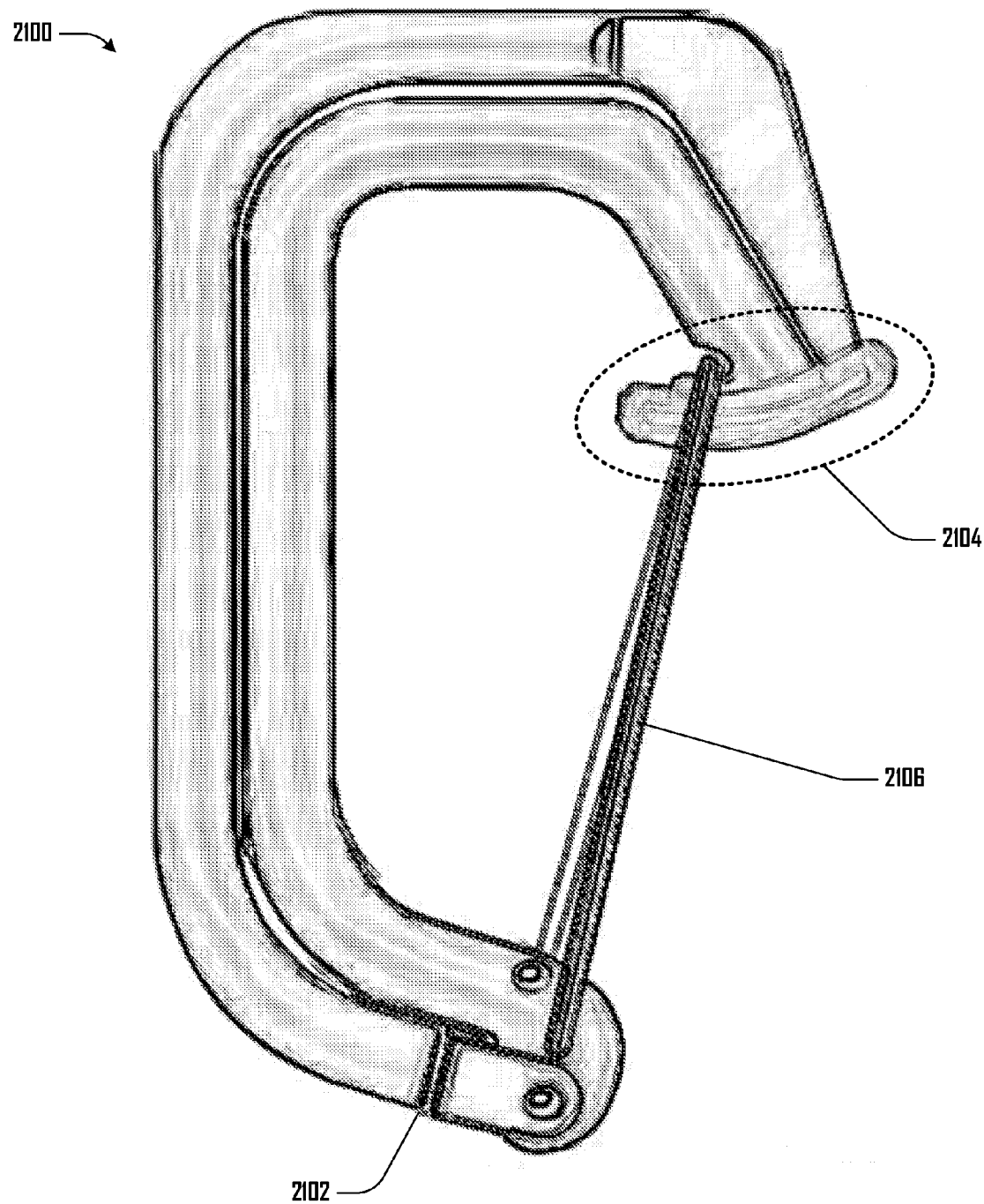
FIG. 21 is an elevation view of an embodiment of a Hook-Carabineer.
Figure 22:
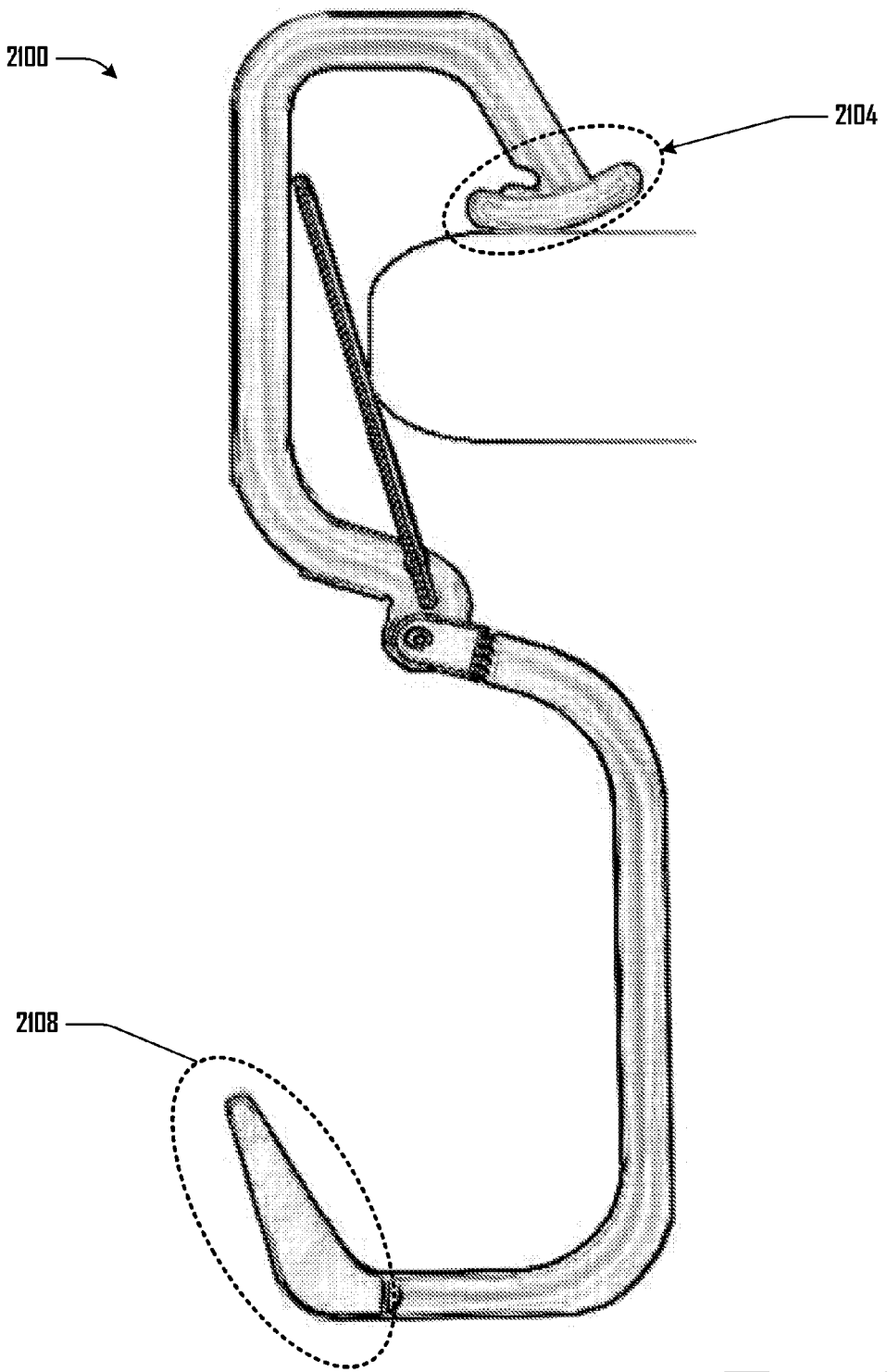
FIG. 22 is an elevation view of an embodiment of the Hook-Carabineer of FIG. 21, deployed in a first configuration.

Hook-Toe 342 is illustrated with a circular shape (when viewing Hook-Carabineer 100 on its plane), though other shapes are possible. See, for example, FIG. 13, illustrating a Hook-Toe 1302 with a finger which may be deployed like a jack-knife or stowed (folded) within the Hook; or, for example, FIG. 20, illustrating a Hook-Toe 2002 embodiment with a "shoe" type shape; or, for example, FIGS. 21 and 22, illustrating a Hook-Toe 2104 embodiment with a "curved shoe" type shape. Hook-Toe 342 may have a slip-resistant surface to enhance engagement with other surfaces, such as a cross-hatched surface, a rough surface, or another tread, and/or a surface made of or covered with a high-tack material such as rubber, silicone rubber, thermoplastic elastomers, thermosetting polymers, or the like.

Figure 27:
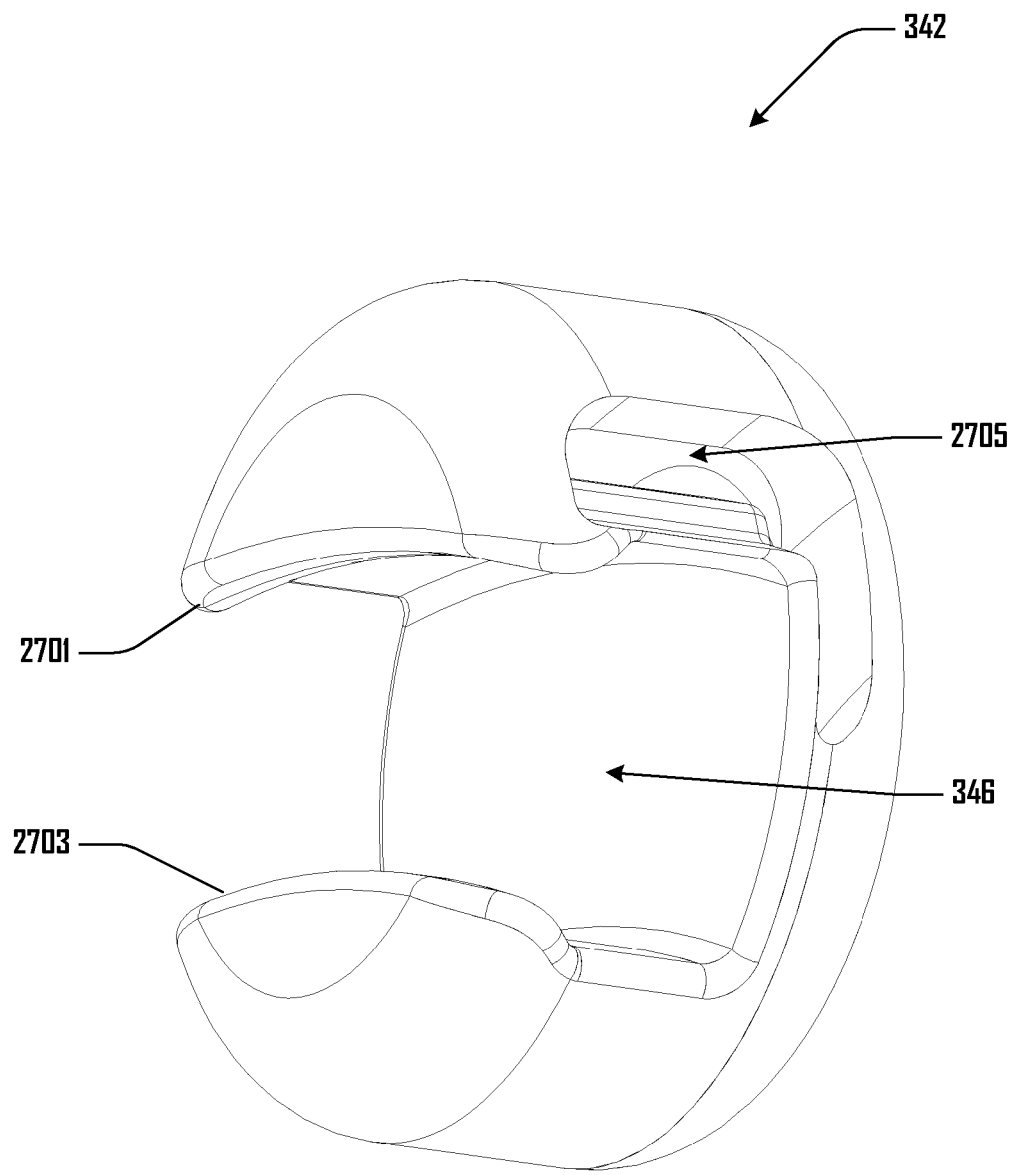
FIG. 27 is a detailed perspective view of an embodiment of a Hook Toe.

Toe-Nose-Slot 346 is illustrated in FIG. 3 as being a slot shaped to accommodate Nose 210, allowing Hook 300 to fold closely against Carabineer 200. Toe-Nose-Slot 346 may comprise a magnet, such as Hook Magnet 313, or a ferrous material (such as iron) to engage with the Magnet 208, thereby releasably connecting the Hook 300 to the Carabineer 200. Toe-Nose-Slot 346 may taper to closely follow a tapered profile of Nose 210 or may otherwise follow the profile of Nose 210. Hook-Toe 342 and/or a cover for Hook-Toe 342 is illustrated in detail in FIG. 27. FIG. 27 illustrates Ridges 2701 and 2703; if made of rubber or another deformable material, the Ridges 2701 and 2703 may allow Nose 210 to be pressed through Ridges 2701 and 2703 and into Toe-Nose-Slot 346. In addition to attraction between Magnet 208 and Hook Magnet 313, Ridges 2701 and 2703 may resist unintentional release of Nose 210 from Toe-Nose-Slot 346. FIG. 27 further illustrates Passage 2705 into which Hook Arc 340 and Hook-Toe 342 may pass. As noted, FIG. 27 may illustrate a cover for Hook-Toe 342.

Hook Arc 340 generally conforms to Basket 214 to reduce the size of Hook-Carabineer 100 when Hook 300 is not deployed. Hook Arc 340 is generally transverse to Hook-Spine 336. Other embodiments are possible in which Hook Arc 340 does not follow the shape of Basket 214 so closely or in which a hook arc lies next to a basket, rather than above Basket 214, when not deployed (see, for example, FIG. 15).

Hook 300 comprises Swivel Interface 332 between Swivel Bracket 326 and Hook-Spine 336. Swivel Bracket 326 may comprise an unthreaded passage through which a bolt or other anchor or the like may pass, which bolt may then attach or be anchored into Hook-Spine 336, which joint allows the Hook 300 to rotate about the plane of the Swivel Interface 332, but wherein the head of the bolt retains Hook-Spine 336 on Swivel Bracket 326. To reduce friction, bushings or washers, such as nylon washers, may lie between the bolt and the Swivel Bracket 326 and between Swivel Bracket 326 and Hook-Spine 336 in the Swivel Interface 332.

Figure 4:
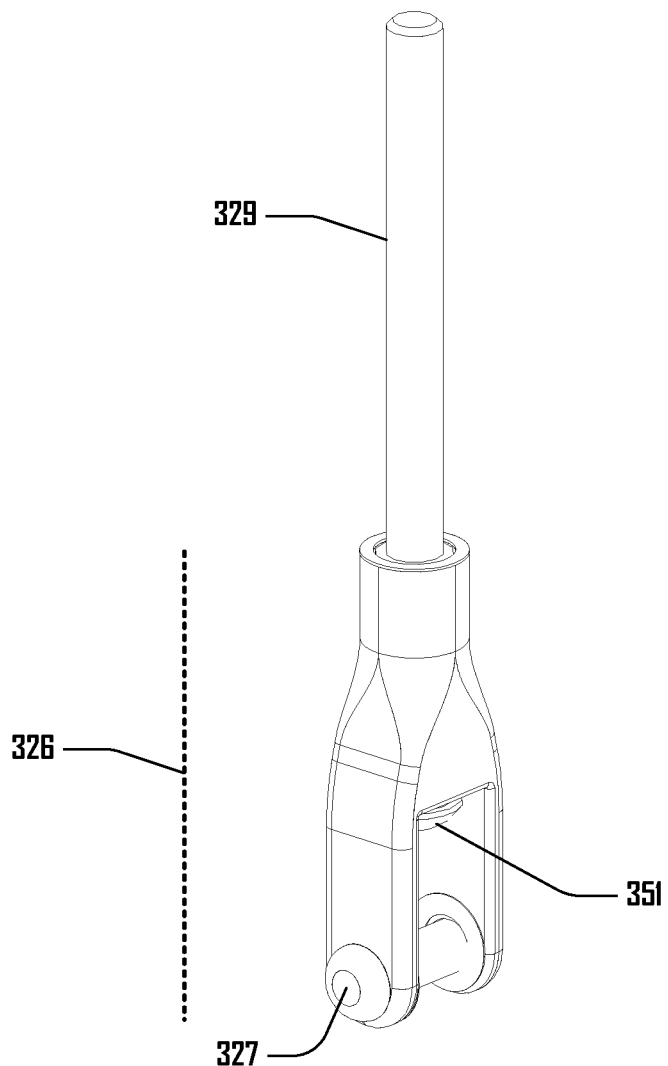
FIG. 4 is a perspective view of an embodiment of a Swivel Bracket component and a Hook-Spine Reinforcement component of a Hook-Carabineer.

FIG. 4 is a perspective view of an embodiment of Swivel Bracket 326 and a Hook-Spine Reinforcement 329 component of Hook-Carabineer 100. Hook-Spine Reinforcement 329 may be a high strength steel or stainless steel pipe or threaded pipe which may pass into a chamber within Hook-Spine 336 and transfer forces experienced by Bolt 351 along the length of Hook-Spine Reinforcement 329. Hook-Spine Reinforcement 329 may be anchored within Hook-Spine 336 by a close fit, by threads, and/or by an adhesive such as a curing polymer resin. Bolt 351 may be anchored in Hook-Spine Reinforcement 329 and Hook-Spine Reinforcement 329 may be anchored in Hook-Spine 336. When Hook 300 rotates about the Swivel Interface 332, Bolt 351 rotates with Hook 300, while Swivel Bracket 326 does not rotate, but remains attached to Carabineer 200. Hook-Spine Reinforcement 329 and Bolt 351 may be the same component, in which case the interior of Hook 300 may be threaded to receive the combined Bolt-Hook-Spine Reinforcement and/or the interior of Hook 300 may otherwise receive the combined Bolt-Hook-Spine Reinforcement (such as via a tight fit and bonding). In another embodiment, the Hook-Spine Reinforcement may extend all the way through the Hook 300 in a straight line from the Swivel Bracket 326, such as through and out of the Hook Arc 340, allowing the end of Bolt 351 distal to the Swivel Bracket 326 to project out of Hook Arc 340, proximate to Hook-Spine 336.

Hook-Spine Reinforcement 329 may also be referred to herein as a "reinforced section" within the Hook 300.

Figure 5:
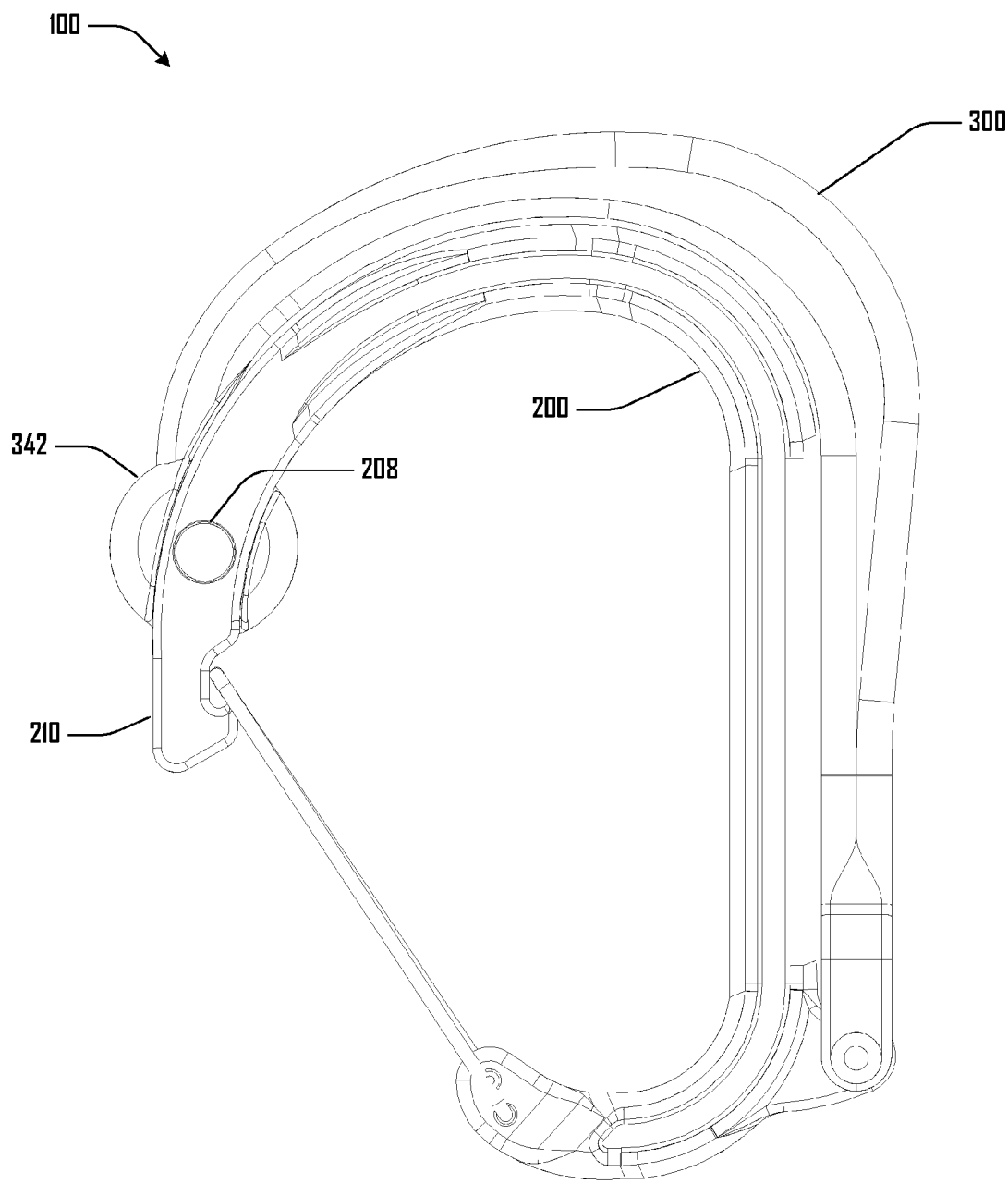
FIG. 5 is an elevation view of a second side of an embodiment of a Hook-Carabineer.

Materials which may be used for various of Carabineer 200 and Hook 300 components include aluminum, steel, stainless steel, magnesium, copper, brass, bronze, alloys thereof, as well as plastics and cross-linking resins, including thermoplastic elastomers and thermosetting polymers, and plastics and cross-linking resins with internal components made of metal. Fabrication techniques may include casting, machining, injection molding, 3D fabrication, pressing, hammering, combinations thereof, or the like FIG. 5 is an elevation view of a second side of an embodiment of a Hook-Carabineer. The Hook-Carabineer 100 in FIG. 5 generally conforms to the Hook-Carabineer 100 illustrated in other Figures, though illustrating a face other than the face illustrated in FIG. 1.

FIG. 6 is an isometric view of an embodiment of Hook-Carabineer 100. The Hook-Carabineer 100 in FIG. 6 generally conforms to the Hook-Carabineer 100 illustrated in other Figures, though illustrating a face other than the face illustrated in FIG. 1.

Figure 7:
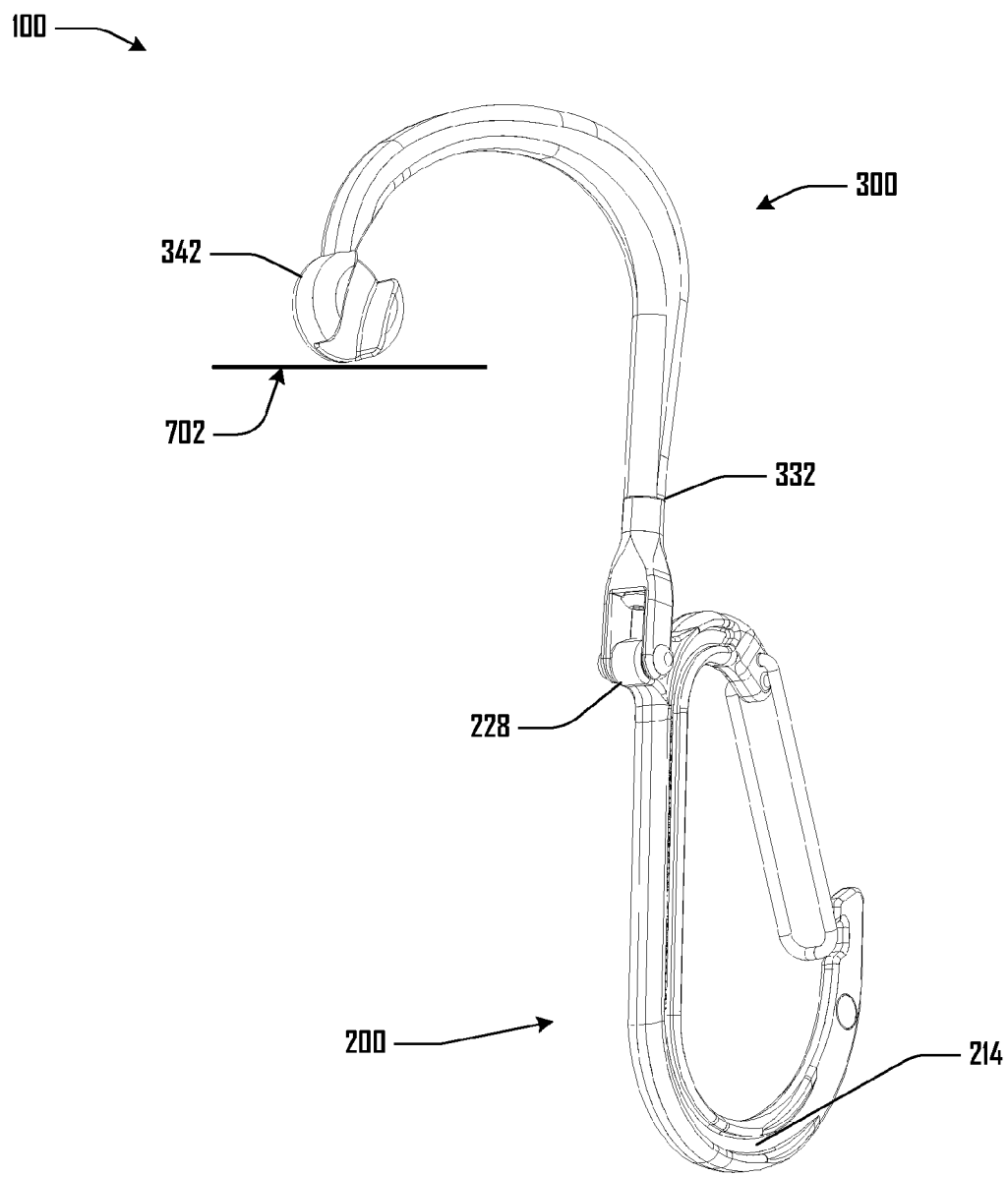
FIG. 7 is a perspective view of an embodiment of a Hook-Carabineer, illustrated with the Hook component deployed.

FIG. 7 is a perspective view of an embodiment of Hook-Carabineer 100, illustrated with the Hook 300 component deployed. Illustrated in FIG. 7 is Surface 702, upon which the Hook-Toe 342 has been placed, hooking the Hook-Carabineer 100 to the Surface 702 and suspending the Carabineer 200 in the air, where it may be clipped to and hold another object, such as the handle of a bag, in the Basket 214. In this illustration, the Hook 300 has been deployed and rotated about Swivel Bracket Mount 228 and the Hook 300 has also been rotated about Swivel Interface 332; in embodiments, Swivel Interface 332 may be omitted, such that the Hook 300 may be deployed, but not rotated about a swivel.

Figure 8:
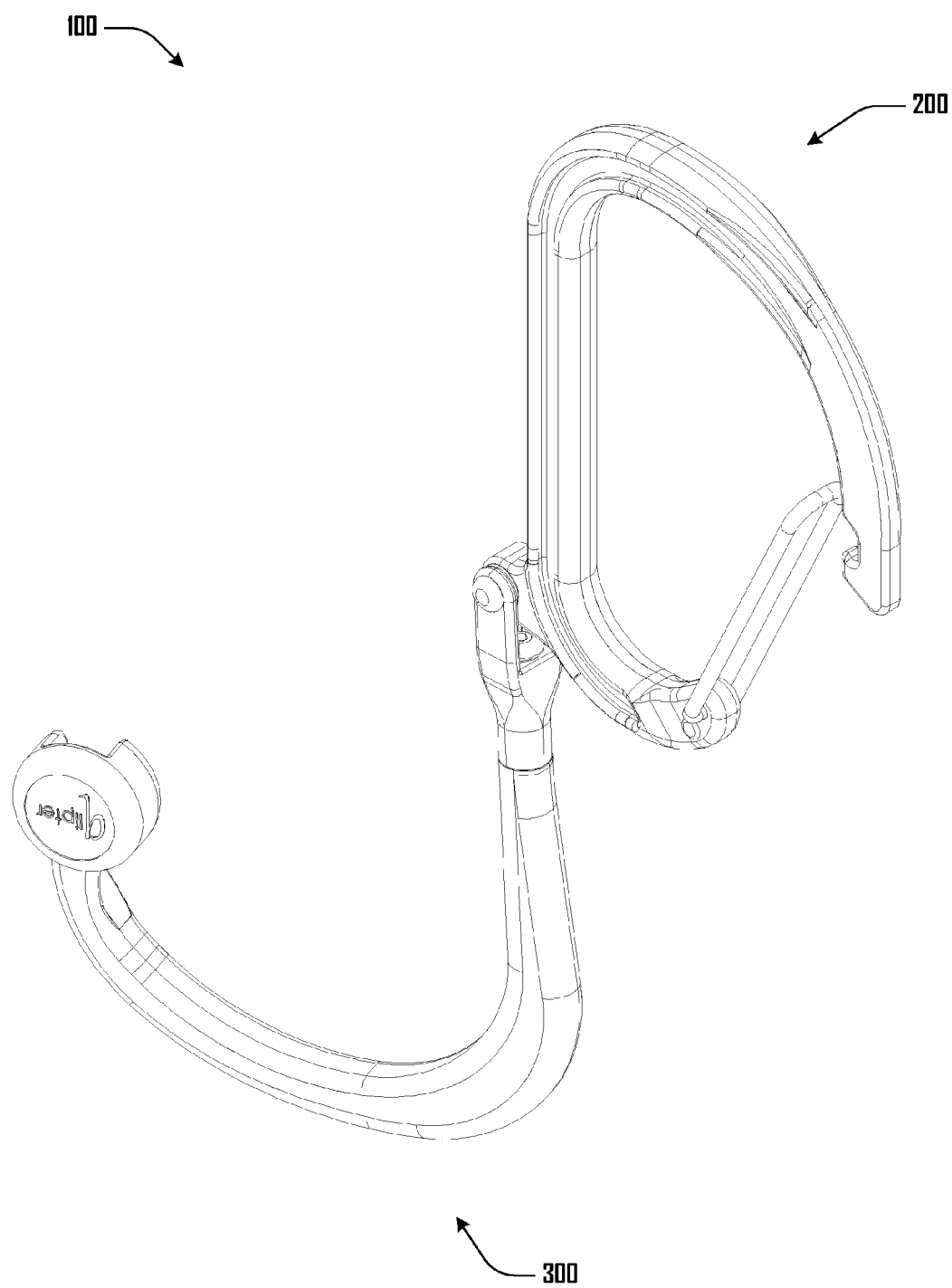
FIG. 8 is a perspective view of an embodiment of a Hook-Carabineer, illustrated with the Hook component deployed.

FIG. 8 is a perspective view of an embodiment of Hook-Carabineer 100, illustrated with Hook 300 deployed. In this illustration, the Carabineer 200 may be connected to an object, such as a rod (which may pass through the Basket 214), while the Hook 300 hangs down to receive another object, such as the handle of a bag.

Figure 9:
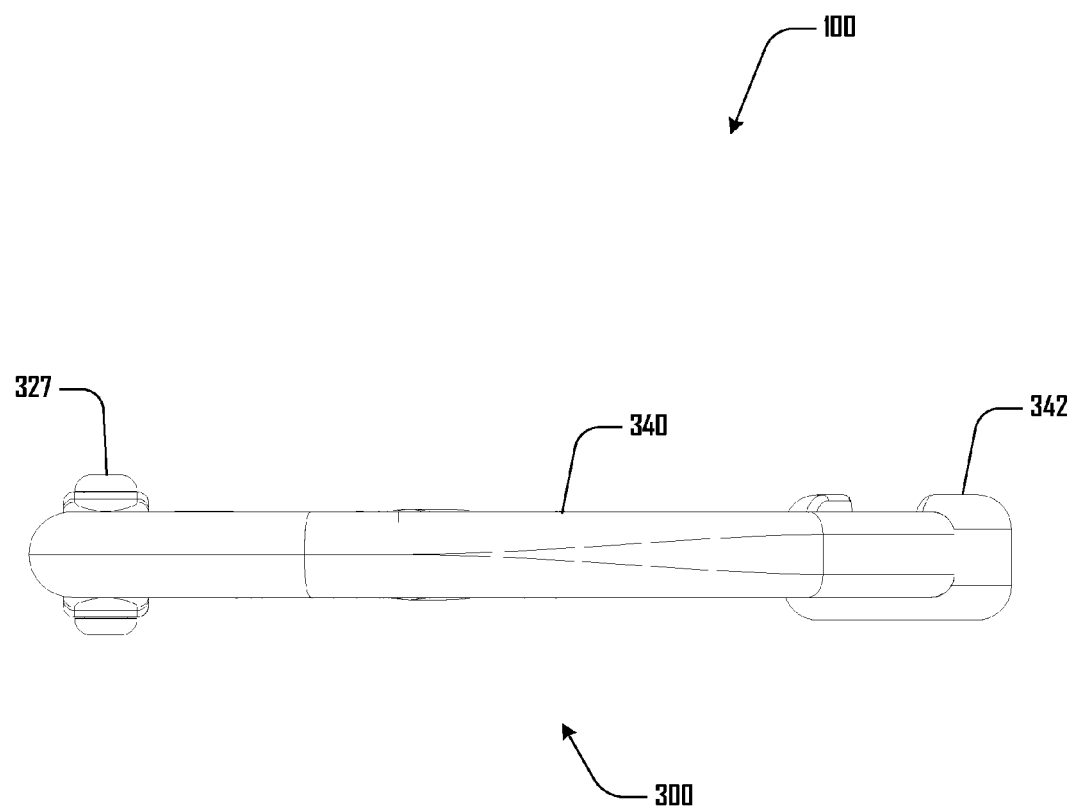
FIG. 9 is a top plan view of an embodiment of a Hook-Carabineer.

FIG. 9 is a top plan view of an embodiment of Hook-Carabineer 100. Components in this illustration are described in relation to other of the Figures and labeled in this Figure to graphically illustrate the functional relationship among the components.

Figure 10:
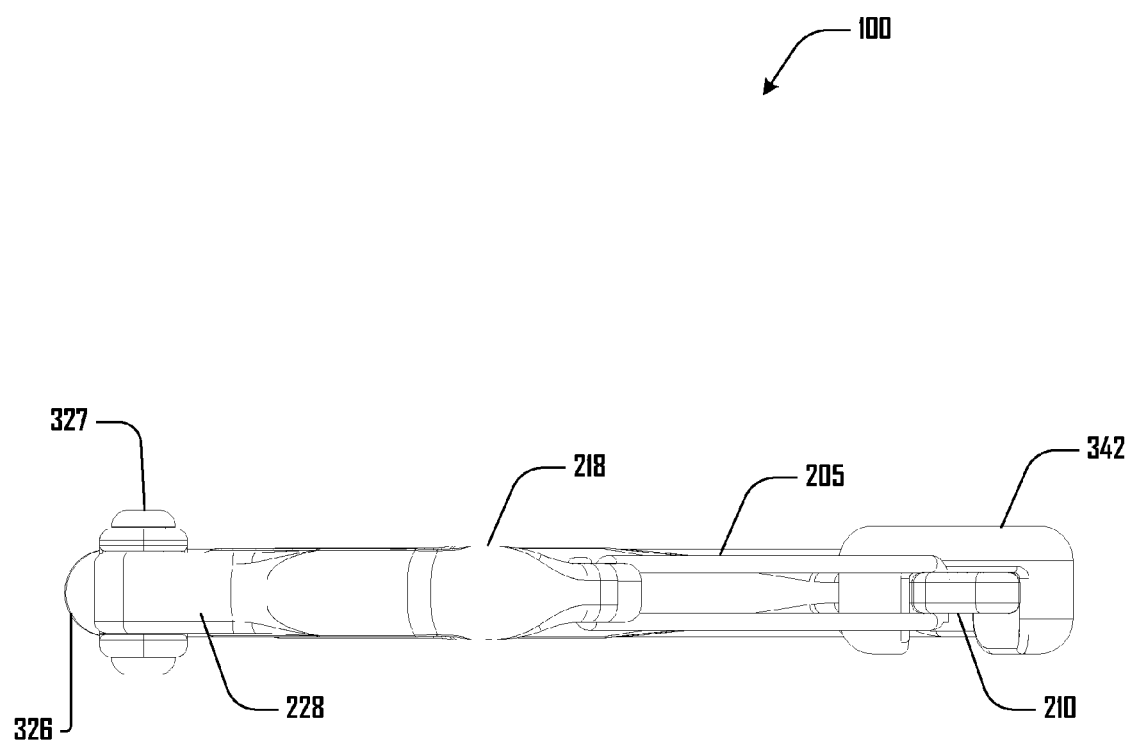
FIG. 10 is a bottom plan view of an embodiment of a Hook-Carabineer.

FIG. 10 is a bottom plan view of an embodiment of Hook-Carabineer 100. Components in this illustration are described in relation to other of the Figures and labeled in this Figure to graphically illustrate the functional relationship among the components.

Figure 11:
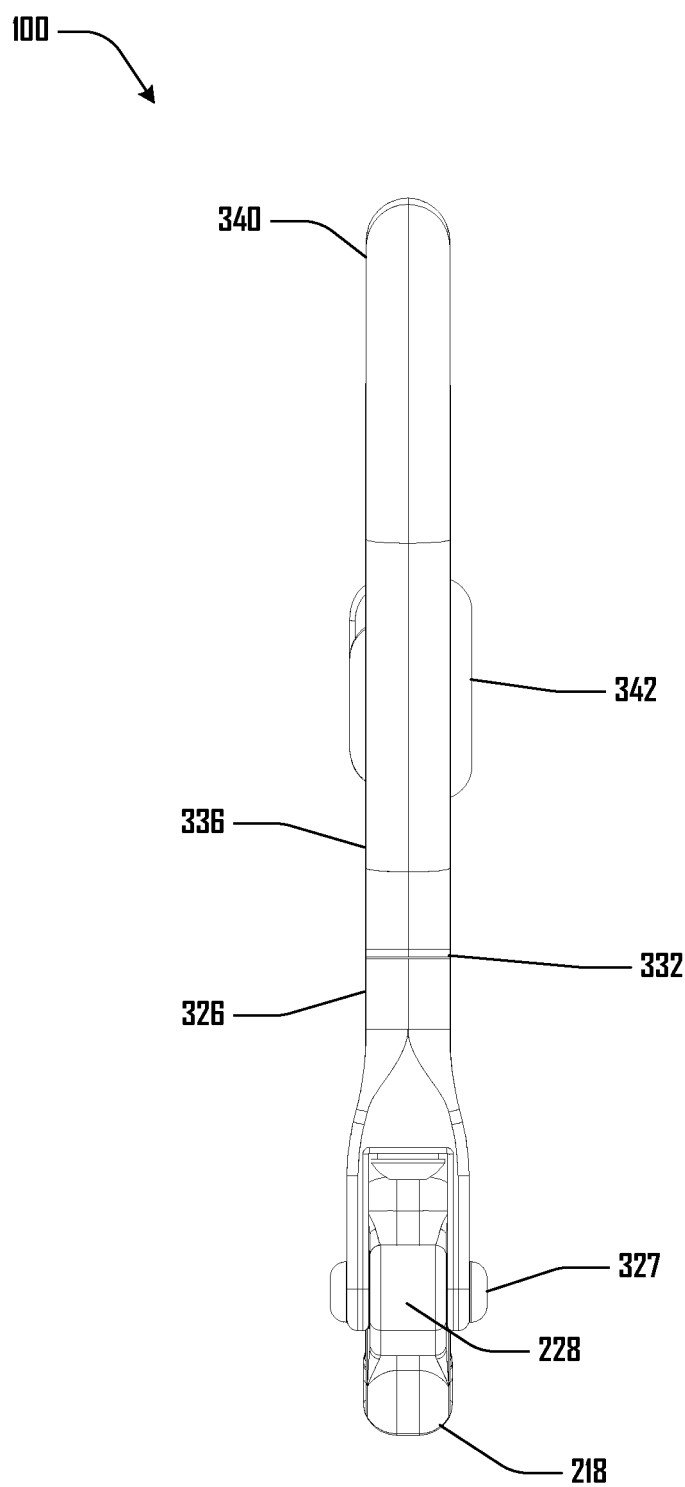
FIG. 11 is an elevation view of a third side of an embodiment of a Hook-Carabineer.

FIG. 11 is an elevation view of a third side of an embodiment of Hook-Carabineer 100. Components in this illustration are described in relation to other of the Figures and labeled in this Figure to graphically illustrate the functional relationship among the components.

Figure 12:
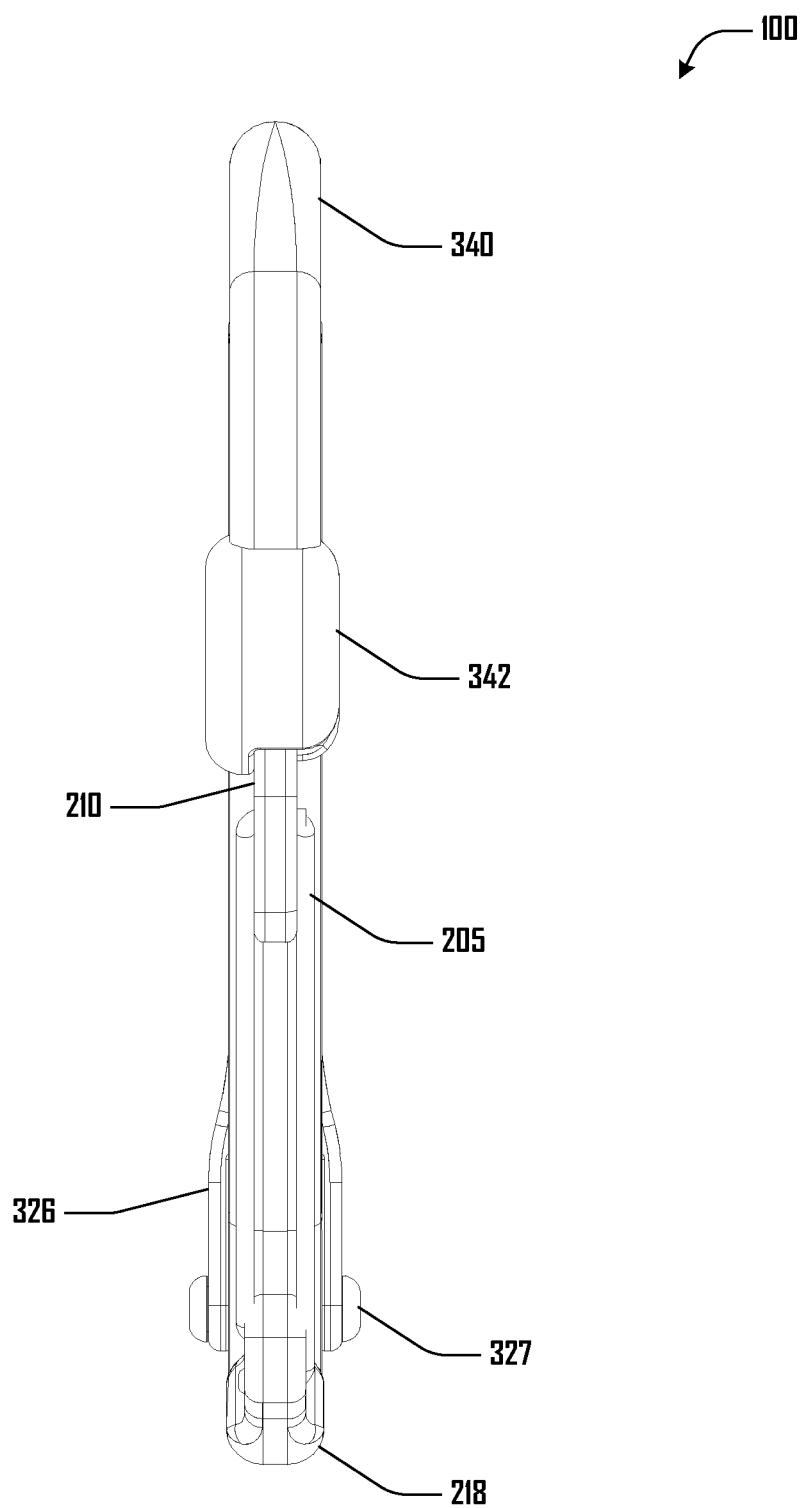
FIG. 12 is an elevation view of a fourth side of an embodiment of a Hook-Carabineer.

FIG. 12 is an elevation view of a fourth side of an embodiment of Hook-Carabineer 100. Components in this illustration are described in relation to other of the Figures and labeled in this Figure to graphically illustrate the functional relationship among the components.

Figure 14:
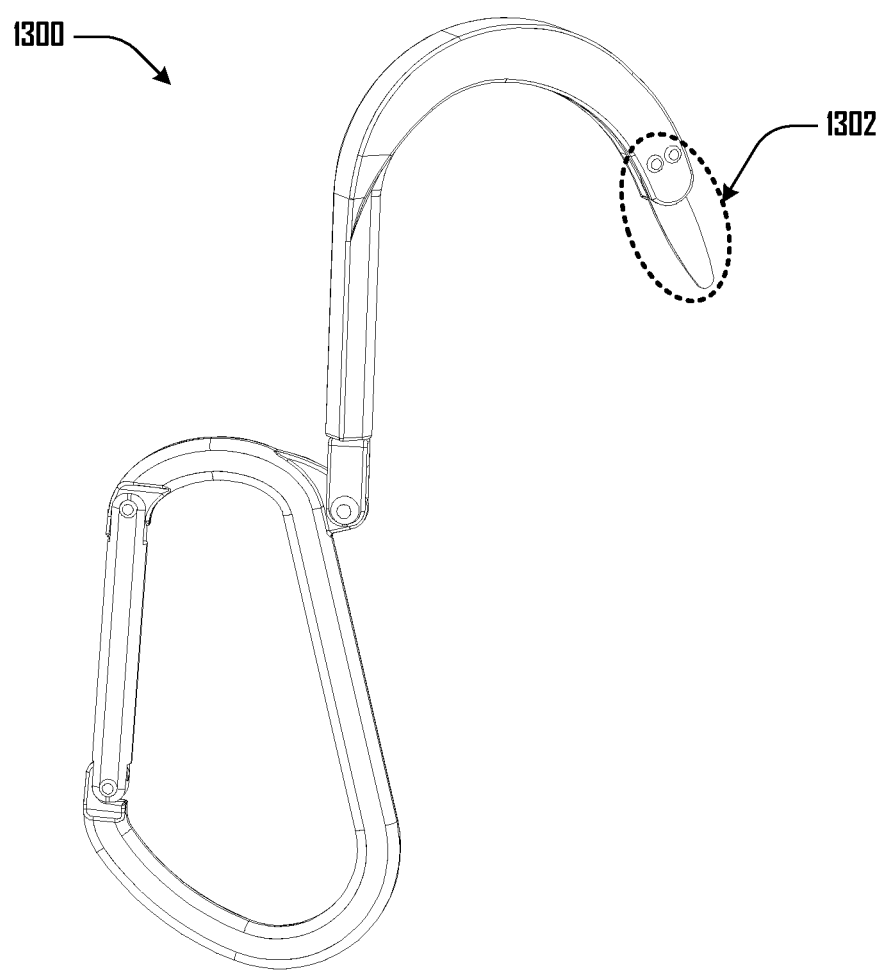
FIG. 14 is an elevation view of an embodiment of the Hook-Carabineer illustrated in FIG. 13, with the Hook component deployed.

FIG. 13 is an isometric view of an embodiment of a Hook-Carabineer 1300. As noted above, FIG. 13 illustrates an embodiment of a Hook-Carabineer 1300, illustrating a Finger Hook-Toe 1302 which may be deployed like a jack-knife. The Finger Hook-Toe 1302 in FIG. 13 is located on the side of the Hook away from the Nose to allow the Finger Hook-Toe 1302 to be folded into the Hook. FIG. 14 is an elevation view of an embodiment of the Hook-Carabineer illustrated in FIG. 13, with the Hook component deployed.

Figure 15:
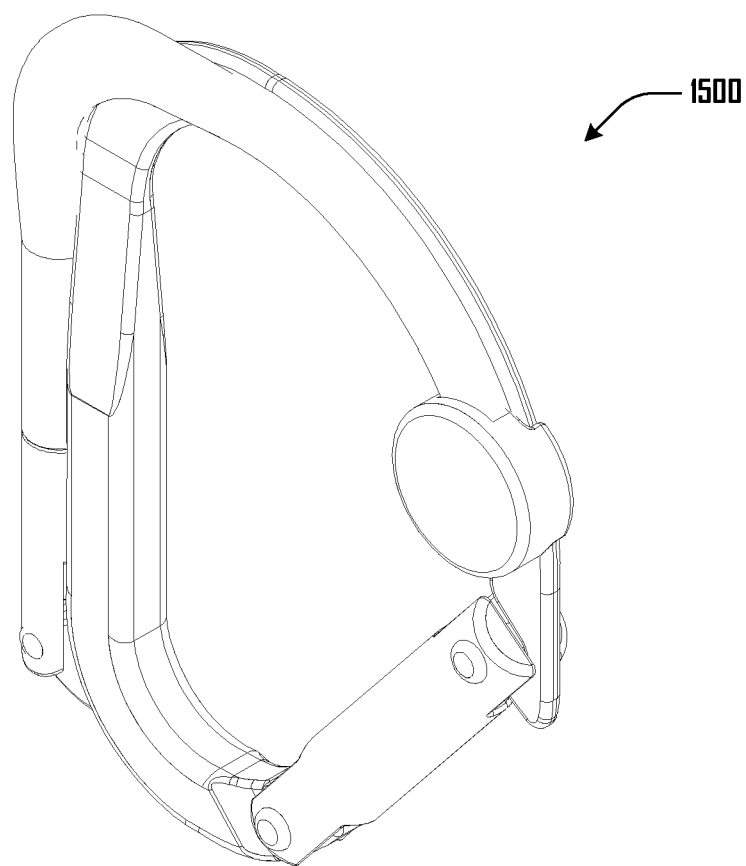
FIG. 15 is an isometric view of an embodiment of a Hook-Carabineer, in which the Hook component folds against the side of the Carabineer.
Figure 16:
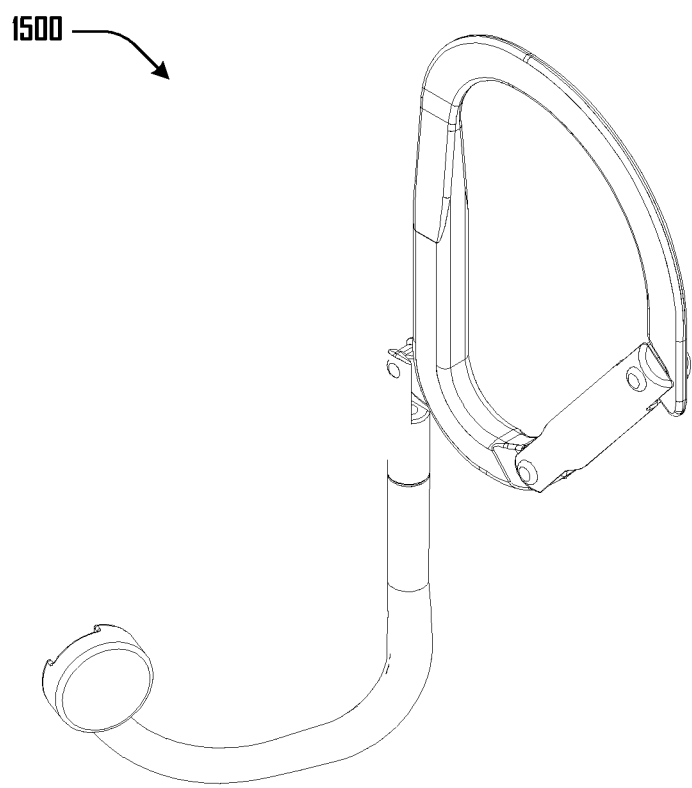
FIG. 16 is an isometric view of an embodiment of the Hook-Carabineer of FIG. 15, with the Hook component deployed.

FIG. 15 is an isometric view of an embodiment of Hook-Carabineer 1500, in which the Hook component folds against the side of the Carabineer. FIG. 16 is an isometric view of Hook-Carabineer 1500, with the Hook component deployed. FIG. 16 is an isometric view of Hook-Carabineer 1500, with the Hook component deployed. The Hook-Carabineer 1500 illustrated in these two Figures has a Spine which tapers toward the Basket and a Basket and Nose which have a roughly continuous cross-sectional volume. The Hook illustrated in these Figures, when folded, rests next to the Basket, rather than, for example, the examples illustrated in FIGS. 1 and 17 (and other Figures) in which the Hook, when folded, rests above the Basket.

Figure 17:
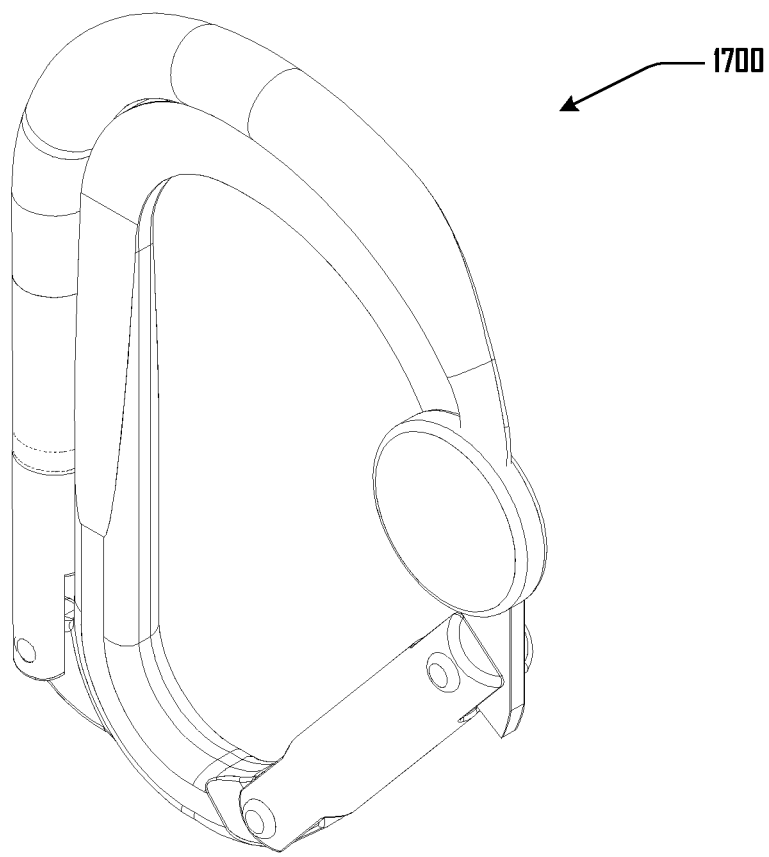
FIG. 17 is an isometric view of an embodiment of a Hook-Carabineer, in which the Hook component folds into a position above the Carabineer.

FIG. 17 is an isometric view of an embodiment of a Hook-Carabineer 1700, in which the Hook component folds into a position above the Basket of the Carabineer, in contrast to, for example, the configuration illustrated in FIGS. 15 and 16, in which the Hook, when folded, rests next to the Basket. The Basket illustrated in FIG. 17 has a narrower cross-section than the cross-section of the Basket 214.

Figure 18:
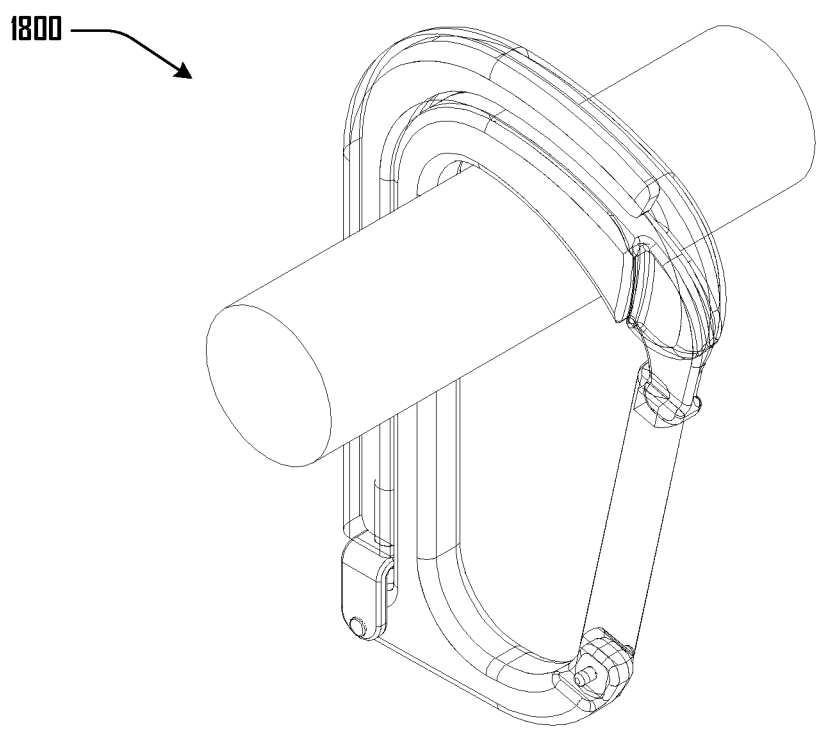
FIG. 18 is an isometric view of an embodiment of a Hook-Carabineer with a rod passing below the Basket.

FIG. 18 is an isometric view of an embodiment of a Hook-Carabineer 1800 with a rod passing below the Basket. This Figure illustrates how a rod or similar item may be present in the Basket.

FIG. 19 is an isometric view of an embodiment of a Hook-Carabineer 1900, in which the Hook rotates about an axis projecting off of the side of the Carabineer, in a plane next to the plane of the Carabineer. This Figure illustrates an embodiment in which the Hook-Carabineer Axle is off-set to the side of the Carabineer, as an Off-Set Hook-Carabineer Axle 1902. This Figure also illustrates an embodiment of a Flat-Head Hook-Toe 1904 with a substantially flat portion, in contrast to, for example, the Hook-Toe 342 illustrated in other of the Figures.

FIG. 20 is an elevation view of an embodiment of a Hook-Carabineer 2000, with Hook component deployed. This Figure illustrates a Hook-Toe 2002 embodiment in which the Hook-Toe 2002 is elongated, relative to the Nose.

Figure 23:
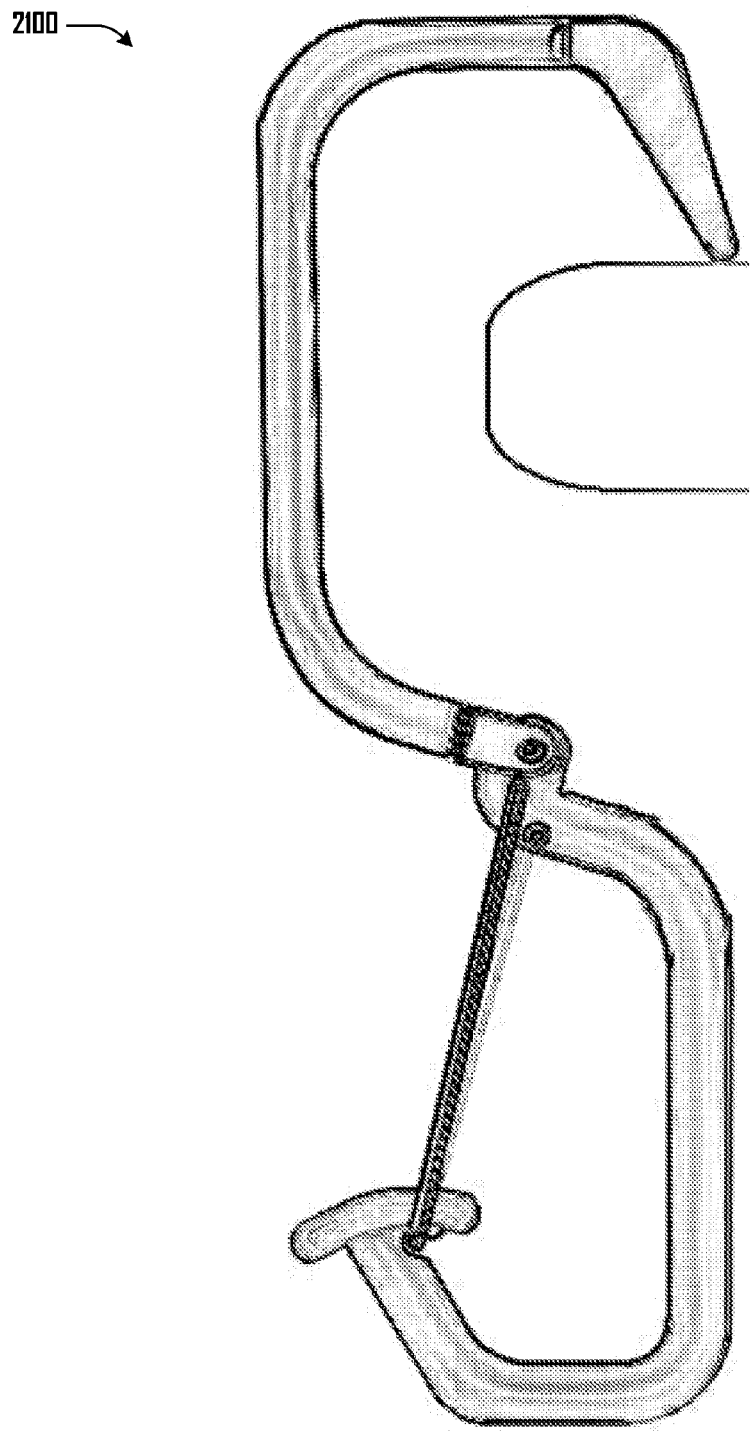
FIG. 23 is an elevation view of an embodiment of the Hook-Carabineer of FIG. 21, deployed in a second configuration.

FIG. 21 is an elevation view of an embodiment of a Hook-Carabineer 2100. FIG. 22 is an elevation view of Hook-Carabineer 2100, deployed in a first configuration, in which the Carabineer 2100 is being used as a hook, with Hook-Toe 2104 resting on a surface, with the Gate displaced by the surface and the Hook hanging below, available to hook onto a strap or other item. FIG. 23 is an elevation view of an embodiment of the Hook-Carabineer of FIG. 21, deployed in a second configuration in which the Hook is resting on the surface and the Carabineer is hanging below, available to be connected to an item. These Figures illustrate that the Hook-Carabineer 2100 may have a Wire Gate 2106, that the Hook-Toe 2104 may have a semi-circular or curved shape, and that the Hook-Toe 2104 may accommodate the Hook-Nose 2108 when folded, as illustrated in FIG. 21. Element 2102 may be a Swivel.

Figure 24:
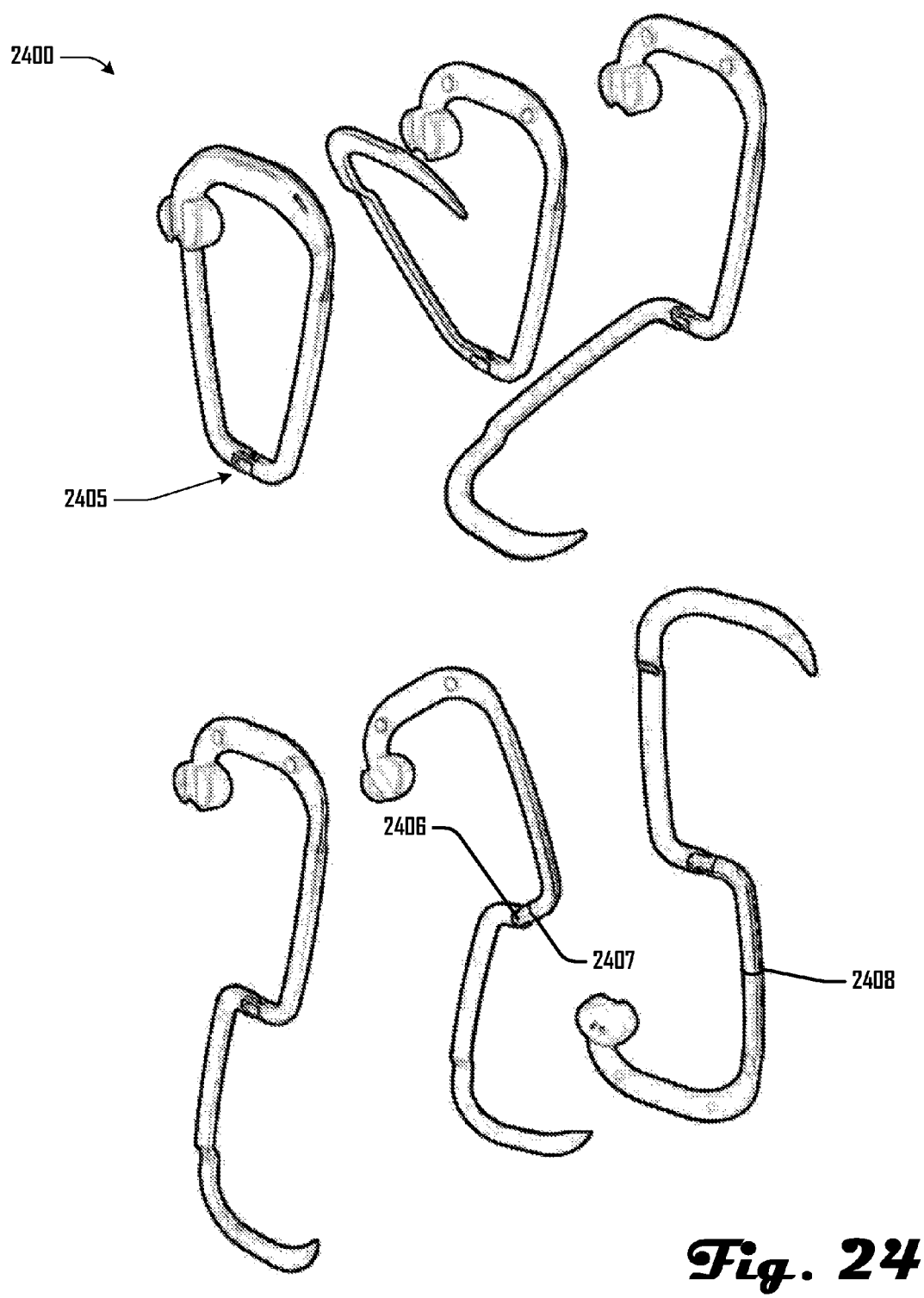
FIG. 24 contains multiple isometric views of an embodiment of a Collapsible Hook, which views illustrate the transition from not deployed to deployed.

FIG. 24 contains multiple isometric views of an embodiment of a Collapsible Hook 2400, illustrating the transition from not deployed to deployed. Hook-Carabineer 2400 does not include a Gate and does include a Joint 2405 capable of two-degrees of motion: A first degree allowing the components to rotate about a swivel and a second degree allowing the components to rotate about an axis which is perpendicular to the axis of the swivel. The swivel may be located at, for example, element 2407 while the axis may be located at, for example, element 2406. An additional swivel may be located in one or both of the arms, such as at element 2408.

Figure 25:
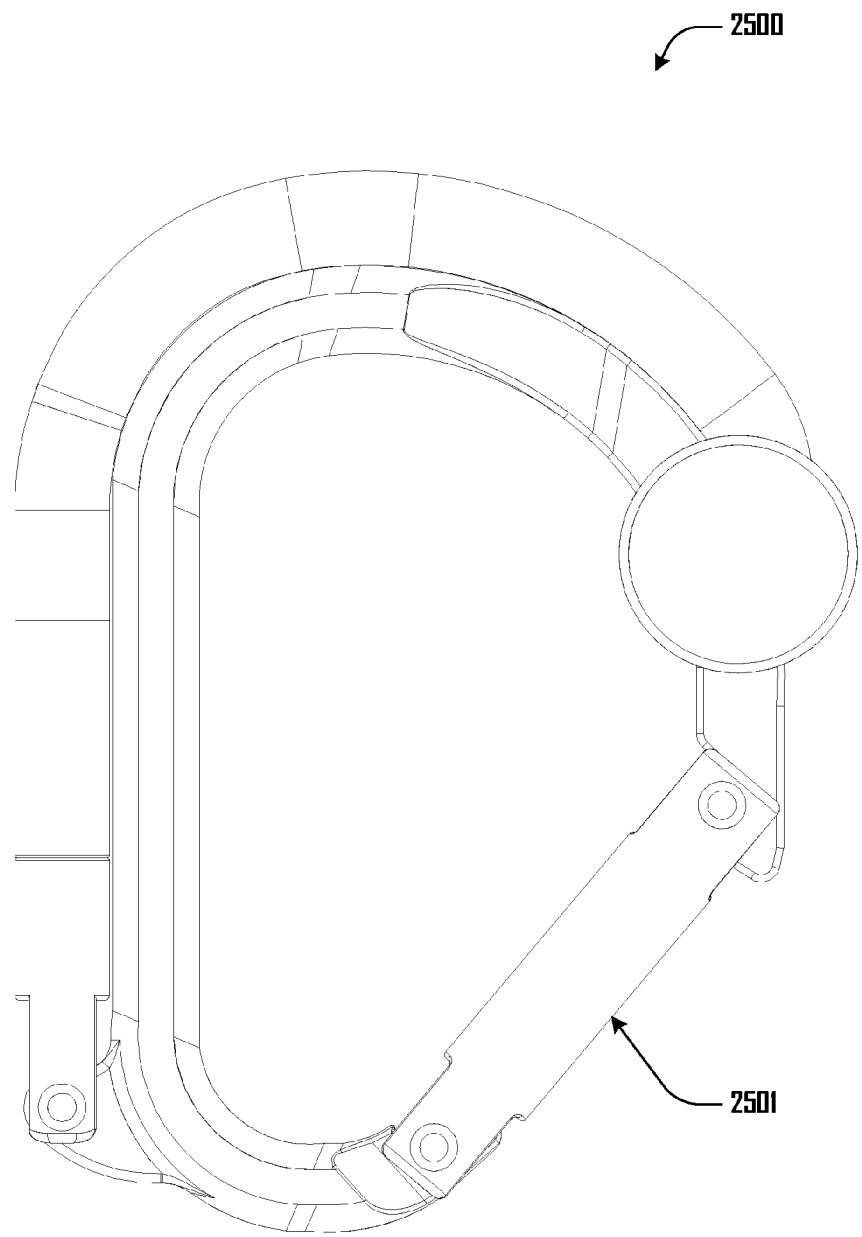
FIG. 25 is an elevation view of an embodiment of a Hook-Carabineer with a Solid Gate.

FIG. 25 is an elevation view of an embodiment of a Hook-Carabineer 2500 with a Solid Gate 2501.

Figure 26:
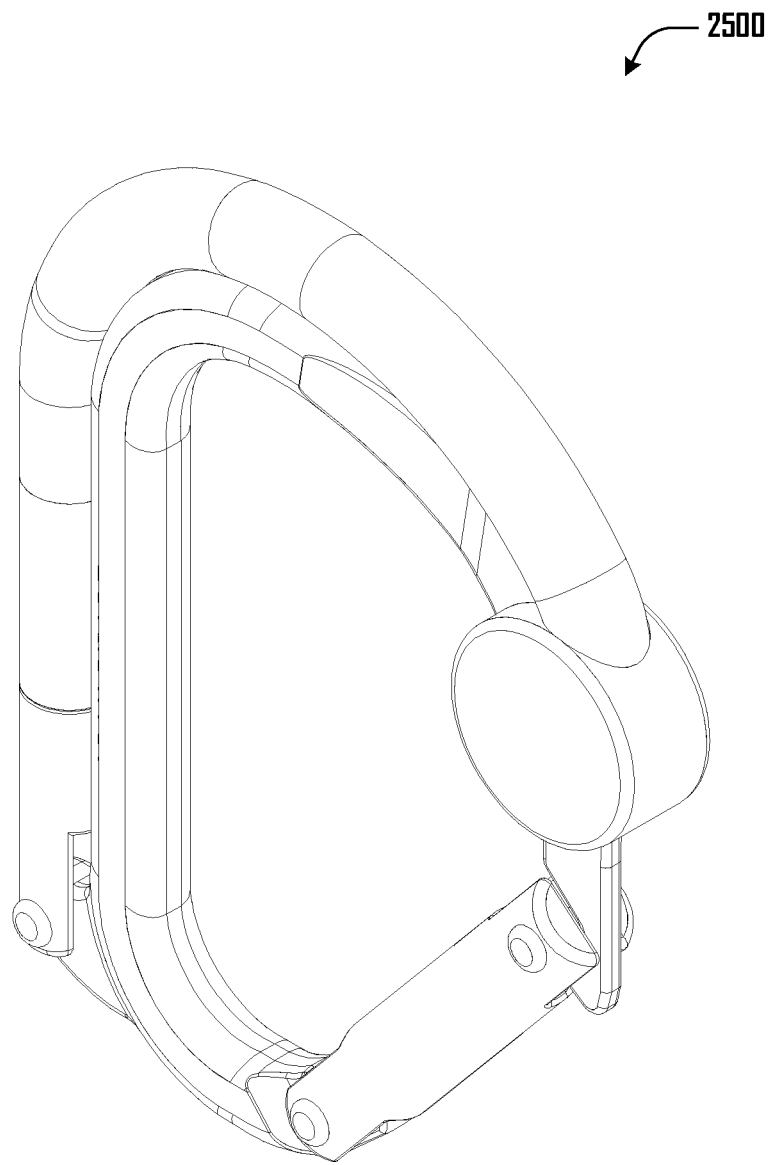
FIG. 26 is an isometric view of the embodiment of a Hook-Carabineer illustrated in FIG. 25.

FIG. 26 is an isometric view of Hook-Carabineer 2500.

FIG. 27 is a detailed perspective view of an embodiment of Hook-Toe 342 and/or a cover for Hook-Toe 342. FIG. 27 is discussed further above.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize.

The invention claimed is:

1. A carabineer comprising a gate, a hook, and a hook-carabineer bracket which rotatably attaches the hook to the carabineer, wherein the hook-carabineer bracket comprises a hook hinge and a swivel attaches the hook-carabineer bracket and the hook and allows the hook to rotate about a swivel axis perpendicular to an axis of rotation of the hook hinge.

2. The carabineer of claim 1, wherein the hook-carabineer bracket is diagonally opposite a gate opening in the carabineer.

3. The carabineer of claim 1, wherein the hook hinge has a rotational axis perpendicular a plane of the carabineer.

4. The carabineer of claim 1, wherein the hook comprises a toe.

5. The carabineer of claim 4, wherein the toe is circular.

6. The carabineer of claim 4, wherein the toe comprises a channel.

7. The carabineer of claim 6, wherein a nose of the carabineer fits within the channel.

8. The carabineer of claim 7, wherein the channel comprises ridges, which ridges contain the carabineer nose within the channel.

9. The carabineer of claim 6, wherein the toe comprises a toe magnet, which toe magnet may be attracted to a magnet in a nose of the carabineer.

10. The carabineer of claim 6, wherein the toe comprises a slip-resistant material.

11. The carabineer of claim 10, wherein the slip-resistant material is one of rubber, silicone rubber, thermoplastic elastomer, and a material with a tread.

12. The carabineer of claim 1, wherein the gate is a wire gate or a solid gate.

13. The carabineer of claim 12, wherein the gate comprises a spring which biases the gate to close against a nose of the carabineer.

14. The carabineer of claim 1, wherein the carabineer comprises a nose, a basket, a spine, and a heel, and wherein the nose has a normal cross-section which is smaller in area than a normal cross-section of the basket.

15. A carabineer comprising a gate, a hook, and a hook-carabineer bracket which rotatably attaches the hook to the carabineer, wherein the hook-carabineer bracket comprises a hook hinge and a swivel attaches the hook-carabineer bracket and the hook and the hook comprises a reinforced section and a bolt attaches the hook-carabineer bracket to the hook via the reinforced section.

16. A carabineer comprising a gate, a hook, and a hook-carabineer bracket which rotatably attaches the hook to the carabineer, wherein the hook conforms to at least a portion of the carabineer and a hook hinge in the hook-carabineer bracket and a swivel between the hook-carabineer bracket and the hook allow the hook to fold against the carabineer.

\* \* \* \* \*